US008344058B2

(12) United States Patent
Flores Santos et al.

(10) Patent No.: US 8,344,058 B2
(45) Date of Patent: Jan. 1, 2013

(54) REACTIVE BLOCK COPOLYMERS AS ADDITIVES FOR THE PREPARATION OF SILICATE-POLYMER COMPOSITES

(75) Inventors: Leticia Flores Santos, Metepec (MX); Alfonso González Montiel, Atizapán de Zaragoza (MX); Maria Dolores Baeza Alvarado, Lerma (MX)

(73) Assignee: CID Centro de Investigación y Desarrollo Technológico S.A. de C.V., Lerma (MX)

( * ) Notice: Subject to any disclaimer, the term of this patent is extended or adjusted under 35 U.S.C. 154(b) by 537 days.

(21) Appl. No.: 11/711,206

(22) Filed: Feb. 26, 2007

(65) Prior Publication Data
US 2008/0033092 A1    Feb. 7, 2008

Related U.S. Application Data

(63) Continuation-in-part of application No. 11/508,407, filed on Aug. 23, 2006.

(60) Provisional application No. 60/711,890, filed on Aug. 26, 2005.

(51) Int. Cl.
*C08J 3/18* (2006.01)
*C08K 3/34* (2006.01)
*C08L 83/02* (2006.01)

(52) U.S. Cl. ........ 524/445; 524/449; 524/543; 524/556; 525/242; 525/299

(58) Field of Classification Search .......... 524/445, 524/449, 451, 446, 447, 543, 556; 525/299, 525/301, 302, 242
See application file for complete search history.

(56) References Cited

U.S. PATENT DOCUMENTS

| | | |
|---|---|---|
| 4,569,923 A | 2/1986 | Knudson, Jr. et al. |
| 5,876,812 A | 3/1999 | Frisk et al. |
| 6,050,509 A | 4/2000 | Clarey et al. |
| 6,384,121 B1 | 5/2002 | Barbee et al. |
| 6,451,901 B1 * | 9/2002 | Maekawa et al. ............ 524/505 |
| 6,531,547 B1 | 3/2003 | Visger et al. |
| 6,579,927 B1 | 6/2003 | Fischer |
| 6,632,868 B2 | 10/2003 | Qian et al. |
| 6,767,951 B2 * | 7/2004 | Nair et al. ...................... 524/445 |
| 6,767,952 B2 * | 7/2004 | Dontula et al. ............... 524/445 |
| 6,787,592 B1 | 9/2004 | Powell et al. |
| 7,034,085 B2 | 4/2006 | Mestach et al. |
| 2002/0037953 A1 | 3/2002 | Lan et al. |
| 2004/0242751 A1 * | 12/2004 | Fischer ........................ 524/445 |
| 2005/0004310 A1 | 1/2005 | Hong et al. |
| 2006/0160940 A1 | 7/2006 | Muhlebach et al. |
| 2007/0197710 A1 | 8/2007 | Wu et al. |
| 2007/0219329 A1 | 9/2007 | Po et al. |

FOREIGN PATENT DOCUMENTS
WO    WO 9947575 A1 *  9/1999
WO    WO 2005/056644 A2  6/2005

OTHER PUBLICATIONS

Debnath, S. et al. Journal of Materials Science vol. 22 pp. 4453-4459 published Dec. 1987.*
Alfonso Gonzalez Montiel et al., "Novel Block Copolymers as Compatibilizers for Nanocomposites," International Conference on Polyolefins, vol. 1, Feb. 27, 2005, p. 160-67.

* cited by examiner

*Primary Examiner* — Irina S Zemel
*Assistant Examiner* — Jeffrey Lenihan
(74) *Attorney, Agent, or Firm* — Stephen S. Hodgson

(57) ABSTRACT

A process for making a block copolymer compatibilizer comprises reacting an acrylic and/or vinyl monomer that has functional groups with one or more vinyl monomers in the presence of a free radical initiator and a stable free radical to form a reaction product that includes residual unreacted acrylic and/or vinyl monomer, and reacting one or more vinyl monomers with the reaction product to form a second block that incorporates the residual unreacted acrylic monomer. The block copolymer is used to compatibilize a clay nanocomposite material with a thermoplastic or thermoset resin. The block copolymer can be used with existing, commercially-available clays, or the block copolymer can be formed with a polar block that is miscible in a polar dispersion medium for use as a intercalate in producing a clay nanocomposite material.

18 Claims, 4 Drawing Sheets

Transmission electron microscopy (TEM) image of Example 23, analyzed using a 120kV transmission electron microscope.

TEM image of Example 32, analyzed using a 120kV transmission electron microscope.

X-ray diffractogram for examples 35 and 36 and Cloisite Na+

(o) Cloisite Na+, (▲) Example 35 and (-) Example 36.

Thermogravimetric analysis of example 35 and two commercially available clays (—)Example 35, (--) Cloisite 30B and (—) Cloisite 20A.

REACTIVE BLOCK COPOLYMERS AS ADDITIVES FOR THE PREPARATION OF SILICATE-POLYMER COMPOSITES

CROSS REFERENCE TO RELATED APPLICATION

This application is a continuation in part of U.S. patent application Ser. No. 11/508,407, filed Aug. 23, 2006, which is incorporated by reference and which claims priority to U.S. Provisional Patent Application Ser. No. 60/711,890, filed on Aug. 26, 2005, which is also incorporated by reference.

BACKGROUND OF THE INVENTION

1. Field of the Invention

The present invention pertains to the use of block copolymers containing a reactive monomer or monomers in two or more blocks via controlled free radical polymerization and use of the composition of matter as additives for the preparation of silicate-polymer composites.

2. Description of the Related Art

In the parent invention, U.S. patent application Ser. No. 11/508,407, a block copolymer was discovered that performs well as a compatibilizer. In one embodiment, a process was described for making a block copolymer having a first block with functional groups provided via an acrylic monomer, where no purification step was used after polymerizing the first block so that an amount of unreacted residual monomer, which has functional groups, was intentionally left in the reaction product from the first step. A second block was added to the first block to form the block copolymer. The second block was preferably polymerized from at least one vinyl monomer and the residual unreacted monomer that has functional groups. Functional groups were consequently added into the second block, as well as into the first block, which was discovered to provide a block copolymer that has a good performance as a compatibilizer.

A typical blend composition in the parent comprises from about 1 to about 98 wt % of a first thermoplastic polymer, which has functional groups selected from the group consisting of amino, amide, imide, carboxyl, carbonyl, carbonate ester, anhydride, epoxy, sulfo, sulfonyl, sulfinyl, sulfhydryl, cyano and hydroxyl, from about 0.01 to about 25 wt % of a block copolymer that includes a first block, which has monomeric units of a functionalized acrylic monomer and monomeric units of a vinyl monomer and a second block, which has monomeric units of one or more vinyl monomers and monomeric units of the functionalized acrylic monomer in the first block, and from about 1 to about 98 wt % of a second thermoplastic polymer, which is miscible with or compatible with the second block of the block copolymer, and where the acrylic monomer has functional groups that should react with the functional groups in the first thermoplastic polymer.

The parent invention provides in one embodiment a process for making a block copolymer, which includes the steps of reacting an acrylic monomer, which has functional groups, and one or more vinyl monomers in the presence of a free radical initiator and a stable free radical to form a reaction product, where the reaction product includes residual unreacted acrylic monomer, and reacting one or more vinyl monomers with the reaction product to form a second block, where the second block incorporates the residual unreacted acrylic monomer.

The present invention concerns an application where the parent invention is used in the preparation of silicate-polymer composites. Clays and other fillers are added to polymers to provide a composition that is desirable in one or more aspects.

Silicate-polymer nanocomposites offer a number of significant advantages over traditional silicate-polymer composites. Conventional silicate-polymer composites usually incorporate a high content of the inorganic fillers—from 10 to as much as 50 weight percent (wt. %)—to achieve desired mechanical or thermal properties. Polymer nanocomposites can reach the desired properties, such as increased tensile strength, improved heat deflection temperature and flame retardance, with typically 3-5 wt. % of the nanofiller, producing materials with specific gravity close to that of the unfilled polymer, good surface appearance and better processability than traditional reinforcements. Other properties of nanocomposites such as optical clarity and improved barrier properties cannot be duplicated by conventionally-filled resins at any loading. (Bins & Associates, Plastics Additives & Compounding, 2002, 30-33.)

One general approach to prepare polymer nanocomposites is to employ an approach known as intercalation chemistry of layered inorganic solids. In this approach polymer chains can be inserted into the interlayer space of these layered solids. The layered solids include graphite, clay minerals, transition metal dichalcogenides, metal phosphates, phosphonates and layered double hydroxides, etc. Among them, clay minerals have been widely used and proved to be very effective due to their unique structure and properties. Such minerals include natural clays of the smectite family (e.g., montmorillonite, hectorite and saponite) and synthetic clays (fluorohectorite, laponite y magadite). Among them, montmorillonite and hectorite are to date the most widely used ones. (Zeng, Q.; Yu, A.; Lu, G.; Paul, D., J. Nanosci. Nanotech. 2005, Vol. 5, No. 10, 1574-1592.)

Dispersion of layered clays into a polymer matrix can lead to either a conventional composite or a nanocomposite depending on the nature of the components and processing conditions. Conventional composites are obtained if the polymer can not intercalate into the galleries of clay minerals. The properties of such composites are the similar to that of polymer composites reinforced by microparticles. (Zeng, Q.; Yu, A.; Lu, G.; Paul, D., J. Nanosci. Nanotech. 2005, Vol. 5, No. 10, 1574-1592.). On the other hand, if the polymer intercalates into the clay galleries two extreme nanostructures can result. One is an intercalated nanocomposite, whose ordered layers are maintained with the polymer existing between the silicate layers, in addition to surrounding the clay particles. The other is an exfoliated or delaminated nanocomposite, in which the silicate layers are completely dispersed within a continuous polymer matrix, and thus the silicate (clay) particles lose the ordered structure. In general, exfoliated nanocomposites exhibit greater improvements to the material properties than exfoliated nanocomposites, and therefore is typically the more desired scenario. (Argoti, S. D.; Reeder, S.; Zhao, H.; Shipp, D. A. Polym. Prepr. (Am. Chem. Soc., Div. Polym. Chem.) 2002, 43, 267-268.) The complete dispersion of clay platelets (silicate layers) in a polymer optimizes the number of available reinforcing elements for carrying an applied load and deflecting cracks. The coupling between the tremendous surface area of the clay platelets ~760 $m^2$/g. and the polymer matrix facilitates stress transfer to the reinforcement phase, allowing for tensile and toughening improvements. Conventional polymer—clay composites containing aggregated nanolayer tactoids ordinarily improve rigidity, but they often sacrifice strength, elongation and toughness. However, exfoliated clay nanocomposites, have shown improvements in all aspects of their mechanical performance. High aspect ratio nanolayers also provide properties that are not possible for larger-scaled composites. The impermeable clay layers mandate a tortuous pathway for a permeant to transverse the nanocomposites. The enhanced barrier characteristics, chemical resistance, reduced solvent uptake and flame retardance of clay-polymer nanocomposites all benefit from the hindered diffusion pathways through the nanocomposite. (LeBaron, P. C.; Wang, Z.; Pinnavaia, T. J. Appl. Clay Sci. 1999, 15, 11-29).

Considering the importance of obtaining exfoliated clay nanocomposites in polymeric matrices, several processing strategies have been proposed, which are described below. (Zeng, Q.; Yu, A.; Lu, G.; Paul, D., J. Nanosci. Nanotech. 2005, Vol. 5, No. 10, 1574-1592.)

1. In situ polymerization. In this technique, monomers are intercalated into layered clays and subsequently polymerized within the gallery via heat, radiation, pre-intercalated initiators or catalysts. This strategy has been applied mainly for condensation polymers such as polyurethanes, polyamides, polyethylene terephthalate, epoxy, polylactones and polysiloxanes, polyethylene oxide, although it has also been applied for other polymers like polystyrene. (LeBaron, P. C.; Wang, Z.; Pinnavaia, T. J. Appl. Clay Sci. 1999, 15, 11-29.) There are several patents in which nylon nanocomposites are formed using a monomer that also acts as a swelling agent or tensoactive, since it has a head group formed by an ammonium, pyridinium, sulfonium or phosphonium group. (U.S. Pat. No. 4,739,007, issued to Usuki et al.; U.S. Pat. No. 4,810,734, issued to Kawasumi, et al.; and U.S. Pat. No. 4,889,885, issued to Usuki et al.) Some of the disadvantages of this technique are: i) Clay exfoliation depends on the extent of clay swelling and diffusion rate of monomers in the gallery and ii) oligomers may be formed upon incomplete polymerization. Rodak et al. in U.S. Patent Application Pub. No. 20060211803 modify clay by contacting it with an unsaturated cationic compound and an alkoxyamine or an adduct thereof. The resulting pre-activated clay, which contains a cationic alkoxyamine bound to the clay, may be further treated with a monomer to provide a polymer that is bound to the clay, thereby forming a nanocomposites material. The strategy is complicated since it requires the use of a sophisticated cation which bears a double bond capable of reacting with an alkoxyamine. The reaction between the alkoxyamine and the cation is made in a non-water Solution. Further polymerization with the monomer that will form the polymeric matrix is limited to monomers polymerizable by a controlled radical polymerization process.

2. Solution Exfoliation. In this case layered clays are exfoliated into single platelets using a solvent in which the polymer is soluble. The polymer is then mixed with the clay suspension and adsorbed onto the platelets. The solvent is finally eliminated from the clay-polymer complex through evaporation. This technique is usually employed to modify polar polymers such as epoxy, polyimide, polyethylene, poly(methylmethacrylate) and also polymers made by emulsion processes such as styrene-butadiene and styrene-acrylonitrile copolymers. Some of the disadvantages of this technique are: i) a compatible polymer-clay solvent system is not always available, ii) use of large quantities of solvent and iii) co-intercalation may occur for solvent and polymer.

3. Melt intercalation. In this case layered clays are directly mixed with the polymer matrix in the molten state. The formation of polymer nanocomposites is driven by different forces depending on the technique used. This is a usual technique for styrene and polyolefins. Although in the case of polyolefins a compatibilizer is required. The main disadvantage of this technique is the slow penetration (transport) of polymer within the confined gallery. Comparing this strategy with the first two, it has an environmentally benign approach since no solvent is required and in this case nanocomposites can be processed with conventional plastic extrusion and molding technology. Some of the patents applying this strategy can only achieve intercalation of the polymer (polystyrene or poly(ethylene oxide)) in the clay galleries, but a complete exfoliation is not achieved. (U.S. Pat. No. 5,955,535, issued to Vaia et al.)

Clays consist of stacked aluminosilicate layers that can be separated, but the clay layers, which are held together by electrostatic forces, cannot be broken into separate layers by simple shear, and for that reason, organic modification of the clay is necessary to achieve separation of the stacked clay layers. To obtain a larger spacing, many studies on nanocomposite formation have focused on the modification of clay by introducing organic molecules into the clay layers through a cation-exchange reaction (typically $Na^+$ or $K^+$, are exchanged for organic cations). Hence, there have been many attempts at the organic modification of clay either using organic cations, such as ammonium, imidazolium, phosphonium, stibonium, tropylium, etc., or introducing different organic groups onto these cations. The objective of the modification of the clay is to provide hydrophobic characteristics to the hydrophilic surface of a clay layer, which may permit the entry of organic polymers; at the same time, the spacing of the clay is increased. (Nam, J. B.; Wang, D.; Wilkie, C. A. Macromolecules 2005, 38, 6533-6543.) In some cases, the alkyl ammonium cation can also act as an initiator for in situ polymerization. There are several types of tensoactives (organic cations) that can be selected according to the specific application although in most of the cases the substituents are chains derived from tallow, coconut oil that can or cannot be hydrogenated. (Nam, J. B.; Wang, D.; Wilkie, C. A. Macromolecules 2005, 38, 6533-6543; U.S. Pat. No. 5,747,560, issued to Christiani et al.; U.S. Pat. No. 5,663,111, issued to Gadberry et al.; U.S. Patent Application Pub. No. 2002/0037953 filed by Lan et al.) Organoclays are commercially available materials from producers such as: Southern Clay Products Inc. of Gonzales, Tex. (http://www.nanoclay.com/) under the trade name of Cloisite®, Süd-Chemie Inc. of Munich, Germany (http://www.sud-chemie.com) under the trade name of Nanofil® and Nanocor of Arlington Heights, Ill., a subsidiary of AMCOL International Corporation. (http://www.nanocor.com) under the trade name of Nanomer®.

Among the disadvantages of commercially-available organoclays are: i) the limited amount of organic cations do not guarantee a good interaction between the polymer and the clay, and a good exfoliation is not easy to achieve; and ii) the low thermal stability caused by the thermal degradation of amines according to the Hofmann mechanism. (J. March, Advanced Organic Chemistry, McGraw-Hill, 7th ed.) To overcome these problems a number of strategies have been explored.

In U.S. Pat. No. 6,828,367, Campbell explored the use of an alkyl amine and an aromatic diamine, which has higher thermal stability and can be further reacted. This solution is limited to polymer or polymeric precursors capable of reacting with amine groups, and the patent only discloses improvement in mechanical properties, but no characterization is provided to demonstrate a complete exfoliation. Campbell mixes an inorganic cation such as $(Ti(OC_3H_7)_4$, $Zr(OC_3H_7)_4$, $PO(OCH_3)_3$, $PO(OC_2H_3)_3$, $B(OCH_3)_3$, $B(OC_2H_5)_3$ with an organic intercalant (a water soluble polymer like polyvinyl alcohol, polyclicol, PVP, polyacrilic acid, etc). The organic agent is further calcinated before mixing the modified clay with the thermoplastic or thermoset to be modified, or the organic modifier can have organic groups that interact with the polymeric matrix through some kind of chemical or electrostatic interaction. (International Patent Application Pub. No. WO9731057 for inventors Nichols and Chou.) A variation of this strategy is disclosed in U.S. Pat. No. 5,552,469, issued to Beall et al., which describes the preparation of intercalates derived from certain clays and water-soluble polymers such as polyvinyl pyrrolidone, polyvinyl alcohol and polyacrylic acid. Although the specification describes a wide range of thermoplastic resins including polyesters and rubbers that can be used in blends with these intercalates, there are no examples teaching how to make such blends and if the intercalates transform to exfoliated materials when mixed with the claimed polymers. Another disadvantage is that these strategies might only be adequate for a small group of polymers or polymeric precursors which are compatible with the organic intercalants.

Whereas most of the patents related to clay modification are related to discrete organic molecules bearing a positive charge, fewer examples describe the use of oligomeric or polymeric species to intercalate or exfoliate clays. The use of oligomeric or polymeric species tends to enhance the interaction between the polymer and the clay, since the tensoactive species is chosen to be compatible with or of similar composition as the polymeric matrix.

The use of poly(oxypropylene)diamine to intercalate and exfoliate clays is one example. The amine group contained in the poly(oxypropylene) diamine can be further reacted with the polymeric matrix. (Chu, C.-C.; Chiang, M.-L.; Tsai, C.-M.; Lin, J.-J. Macromolecules 2005, 38, 6240-6243.) This solution is adequate for polymers or polymeric precursors capable of reacting with amine groups, although the document does not include examples of polymers modified with this type of modified clays. A variation of this strategy contemplates the modification of polycaprolactones and polyesters by reacting them with diamines. (U.S. Pat. No. 6,384,121; issued to Barbee et al.; and U.S. Patent Application Pub. No. 2002/0137834 filed by Barbee et al.) The resulting resins are protonated in water and used to modify clays (typically sodium or organically modified montmorillonite) and intercalates are obtained. A variation of this strategy is mixing amorphous oligomers (typically polyamides) with organoclays. (U.S. Patent Application Pub. No. 20020119266 filed by Bagrodia et al.) The resulting organoclay is then added to polymers (polyesters and polyamides) in the molten state and materials with improved mechanical, optical or oxygen permeability reduction are claimed to be obtained. This strategy is also very specific for polymers that can react with an amine.

Recent publications refer to the use of block copolymers as organic intercalants for clays. U.S. Pat. No. 6,579,927, issued to Fischer, describes the use of a block copolymer or graft copolymer comprising structural units (A), which are compatible with the clay, and one or more second structural units (B), which are compatible with the polymeric matrix. Although the composition of the structural units (A) and (B) are described, there appears to be no description or example of how to prepare these block or graft copolymers, and the performance of the modified clays in several polymers is described vaguely, making it unclear if a complete exfoliation was achieved or not.

Muhlebach et al. disclose in U.S. Patent Application Pub. No. 20060160940 a process for manufacturing nanoparticles by intercalating and/or exfoliating natural or synthetic clays using block or comb copolymers having one cationic block and at least one nonpolar block, which are prepared by CRP. The block copolymer has a cationic block A, wherein the cation is based on at least one nitrogen atom, and a nonionic block B, both blocks having a polydispersity between 1 and 3, or a comb copolymer having a cationic backbone A, wherein the cation is based on a nitrogen atom and nonionic oligomeric/polymeric chain B attached thereto, the cationic backbone A having a polydispersity between 1 and 3 and the nonionic side chains having a polydispersity of 1.0-1.8. In order to obtain one or more neutral or nonionic blocks, the process for preparing diblocks requires the isolation of the first block before adding the monomers that will constitute the second block. The process for intercalating the clay requires the use of special additives like Dowanol® (1-methoxy-2-propanol) and a long period of stirring and heating (24 h, 60° C.). The intercalated clay purifying process requires a final washing with ethanol before drying. Finally, the detailed description mentions the use of the nanocomposites dispersions in several applications, but there appears to be no detailed description of how to use them, examples or claims related to the application of these intercalates in the modification of polymeric matrices.

The development of new intercalating agents to improve thermal stability and miscibility of the clay with the polymeric matrix in order to obtain exfoliated clays for polymer reinforcement is an area of intense research, and in most of the cases a mixture of intercalated and exfoliated clay is found. Even for nylon/nanoclay composites, which show a large amount of exfoliated clay and an outstanding mechanical performance when prepared by in situ polymerization, there is a considerable amount of research focused on developing a clay intercalant that can modify nylon using a melt intercalation process. Melt intercalation allows compounders to directly incorporate the clay to a commercially-available polymer using conventional plastic extrusion and molding technology, which offers advantages compared to the in situ polymerization process which can only be done commercially by polymer producers, since a polymerization process is involved.

In the case of polymers with very low polarity such as polyolefins, the panorama is more complicated, since organic clays are not intercalated at all when they are added directly to polymers like polyethylene or polypropylene. (Kim, Y.; L. White, J. Journal of Applied Polymer Science, 2003, 90, 1581-1588.) To overcome this problem, compatibilizers such as maleic anhydride grafted polypropylene (PP-g-MA) have been used. (Kawasumi, M.; Hasegawa, N.; Kato, M.; Usuki, A.; Okada, A. Macromolecules 1997, 30, 6333-6338.) When PP-g-MA is used in a 3:1 ratio with the organoclay, good intercalations are obtained. (Makoto, K.; Arimitsu, U.; Akane, O. Journal of Applied Polymer Science, 1997, 66, 1781-1785.) The amount of PP-g-MA in the final blend may vary but it's usually around 20-30% wt considering the amount of PP as 100%. This large amount of PP-g-MA has some disadvantages. (Lee, E. C.; Mielewski, D. F.; Baird, R. J. Polymer Engineering and Science 2004, 44, 1773-1782.) First, since the molecular weight of PP-g-MA is usually low, it causes a detriment in the mechanical properties of the nanocomposites. Second, PP-g-MA has a higher cost than PP, which adds to the total cost of the nanocomposites.

Polypropylene's attractive combination of low cost, low weight, heat distortion temperature above 100° C., and extraordinary versatility in terms of properties, applications, and recycling have stimulated exceptional growth of polypropylene production. There is a considerable interest in obtaining PP/clay nanocomposites, and most of it is focused on a better processing methodology to exfoliate intercalated clays using a compatibilizer or finding a better compatibilizer.

Styrene maleic anhydride copolymers have been evaluated as compatibilizers of organic clays and polypropylene. (Fang-Chyou, C.; Sun-Mou, L.; Jong-Wu, C.; Pei-Hsien, C.

Journal of Polymer Science: Part B: Polymer Physics 2004, 42, 4139-4150.) The results compared with PP-g-MA depend on the type of organoclay and on the amount of maleic anhydride container in the copolymer.

PP grafted with a copolymer of maleic anhydride, methyl methacrylate and butyl acrylate has also been studied (Ding, C.; Jia, D.; He, H.; Guo, B.; Hong, H. Polymer Testing 2005, 24, 94-100). This strategy increases the molecular weight of grafted PP improving the final mechanical properties. The amount of grafted PP can be reduced to 2% wt relative to the amount of PP. Clay intercalation is improved by the addition of grafted polypropylene but it is not exfoliated. Another disadvantage of this strategy is that the grafted PP is not commercially available. A variation of this strategy is the use of PP grafted with a copolymer of styrene and glycidyl methacrylate and with acrylic acid (M. L. López-Quintanilla; S. Sánchez-Valdés; L. F. Ramos de Valle; Medellín-Rodríguez, F. J. Journal of Applied Polymer Science 2006, 100, 4748-4756). The degree of intercalation depends on the amount of grafted polypropylene and on the type of grafted polypropylene. In general, the results resemble those obtained with PP-g-MA.

Hydroxylated PP has also been tested as an additive to improve organoclay incorporation, obtaining improved intercalations, but the results obtained do not improve the performance of PP-g-MA. (Makoto, K.; Arimitsu, U.; Akane, O. Journal of Applied Polymer Science, 1997, 66, 1781-1785.)

Other strategies include the use of PP-g-MA and thermoplastic polyolefins (polybutadiene, EPDM, ethylene-octene copolymers) in order to modify polyolefins. (International Patent Application Pub. No. WO 2005056644 for inventors Jarus and Cicerchi.) Using this strategy, the amount of PP-g-MA can be reduced to around 5% wt in the final composition, and the thermoplastic polyolefin is added. The examples only compare performance of PP/thermoplastic polyolefins blends against the same blends with PP-g-MA and nanoclays, so there is no evidence of the better performance compared with only using PP-g-MA. Since the thermoplastic polyolefins also modify the mechanical properties and X-ray diffraction information is not provided, it is not clear whether the thermoplastic polyolefin improves intercalation or exfoliation or if it is acting as an impact modifier. Another strategy is the treatment of the organoclay with silanes in order to improve dispersion in PP-g-MA matrix (U.S. Pat. No. 6,632,868, issued to Quian et al.) In this case mechanical tests show performance improvement, but since X-ray diffraction or TEM characterization is not disclosed, the amount or degree of intercalation or exfoliation is not revealed.

As is evident in the discussion above, a great deal of work has been done in the field of producing clay or silicate and polymer composites. While significant improvements have been made over the years in improving the compatibilization of clays with polymers, there is still considerable room for improvement.

SUMMARY OF THE INVENTION

The present invention provides in one aspect a polymer/clay nanocomposite material comprising an organic clay; a thermoplastic matrix, and a block copolymer as a compatibilizer, where the block copolymer has a composition that includes a first block, the first block comprising monomeric units of a functionalized acrylic monomer and/or a functionalized vinyl monomer and monomeric units of a vinyl monomer, and a second block, the second block comprising monomeric units of one or more vinyl monomers and monomeric units of the functionalized acrylic monomer and/or the functionalized vinyl monomer from the first block. A thermoset resin can be used instead of the thermoplastic resin.

In another aspect, the present invention provides a process for making a polymer/clay nanocomposite material, including mixing an organic clay and a block copolymer together in a ratio between the clay and the block copolymer of between 100:1 and 1:1000 to form a nanocomposite concentrate; mixing the nanocomposite concentrate and a functional polyolefin to form a polyolefin masterbatch; and mixing the polyolefin masterbatch and a thermoplastic polymer to obtain a polymer/clay nanocomposite material.

The present invention also provides a block copolymer having one block that is polar, hydrophylic and miscible in a clay slurry for use in clay production and another block that is nonpolar to increase the compatibility with a thermoplastic or thermoset resin. In this case the block copolymer of the present invention replaces conventional intercalate ammonium ions as well as conventional compatibilizers for a clay and thermoplastic or thermoset composite.

The present invention provides a modified clay mineral that includes about 0.5-99% wt of a layered natural and/or synthetic clay mineral having exchangeable cations and 0.5-99% wt of a block copolymer according to the present invention. In one method, the block copolymer can be added in a neutral form to the clay mineral to form a mixture, wherein the clay mineral is dispersed in a dispersion medium; and the pH of the mixture can be modified in order to protonate at least one monomer in the block copolymer and exchange inorganic positive ions contained originally in the clay mineral. In another method, where the clay mineral is dispersed in a dispersion medium, which is typically an aqueous solution, the block copolymer can be added to the dispersed clay mineral in a charged form.

In each case, the present invention provides polymer/clay nanocomposite materials composed of a modified clay mineral made according to the process of the present invention and either a thermoplastic resin or a thermoset resin.

BRIEF DESCRIPTION OF THE DRAWINGS

A better understanding of the invention can be obtained when the detailed description of exemplary embodiments set forth below is considered in conjunction with the attached drawings, which are described as follows.

DETAILED DESCRIPTION OF EXEMPLARY EMBODIMENTS

Figure 1:
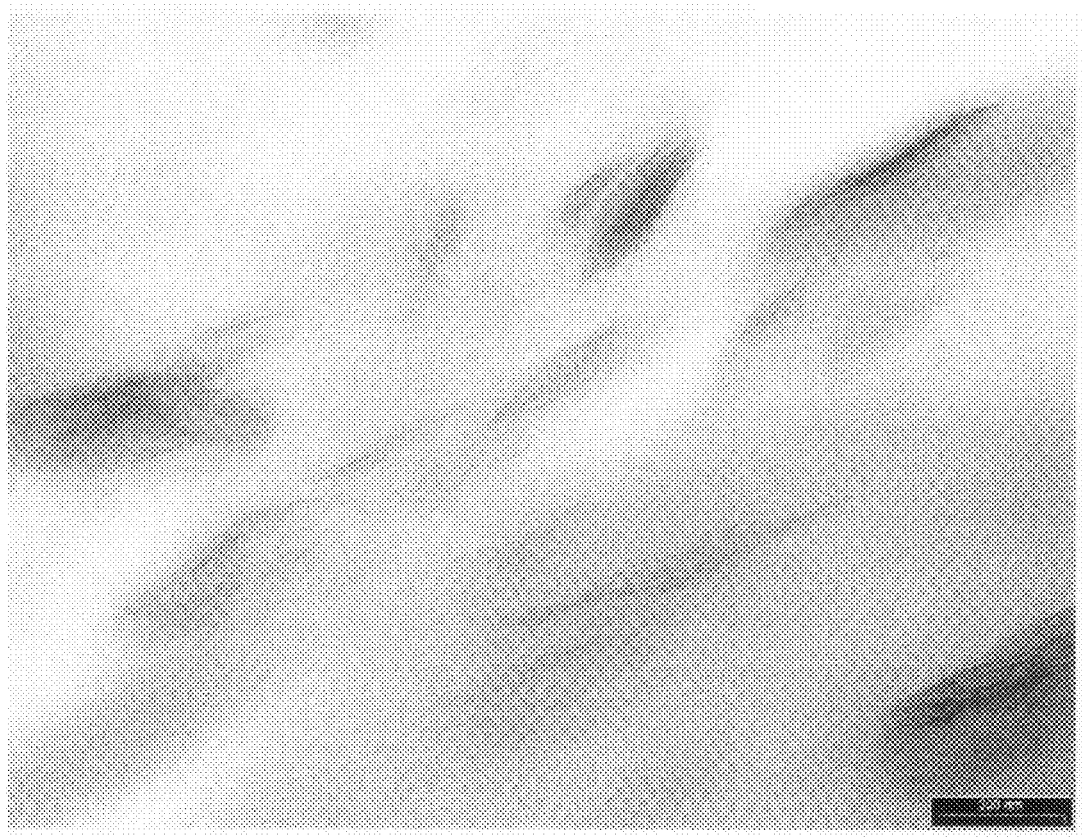
FIG. 1 is a transmission electron microscopy (TEM) image of Example 23, which was analyzed using a 120 kV transmission electron microscope.
Figure 2:
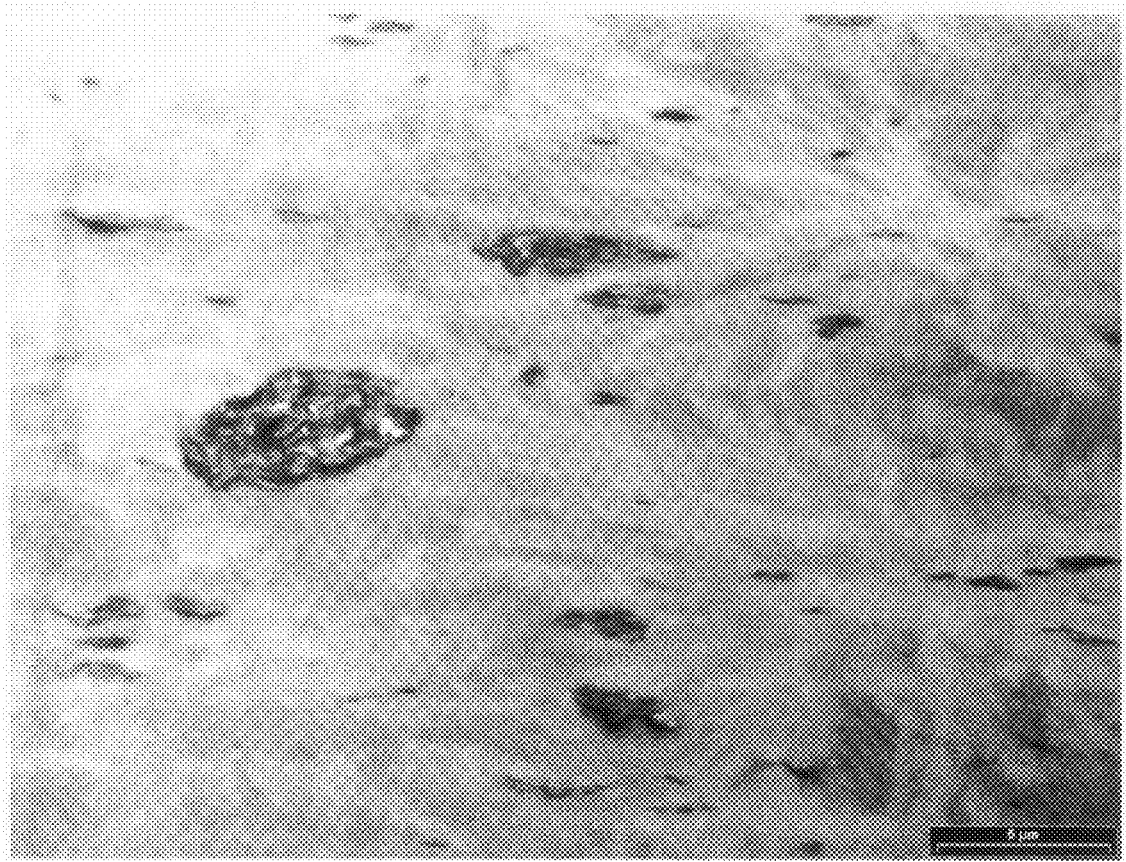
FIG. 2 is a TEM image of Example 32, which was analyzed using a 120 kV transmission electron microscope.
Figure 3:
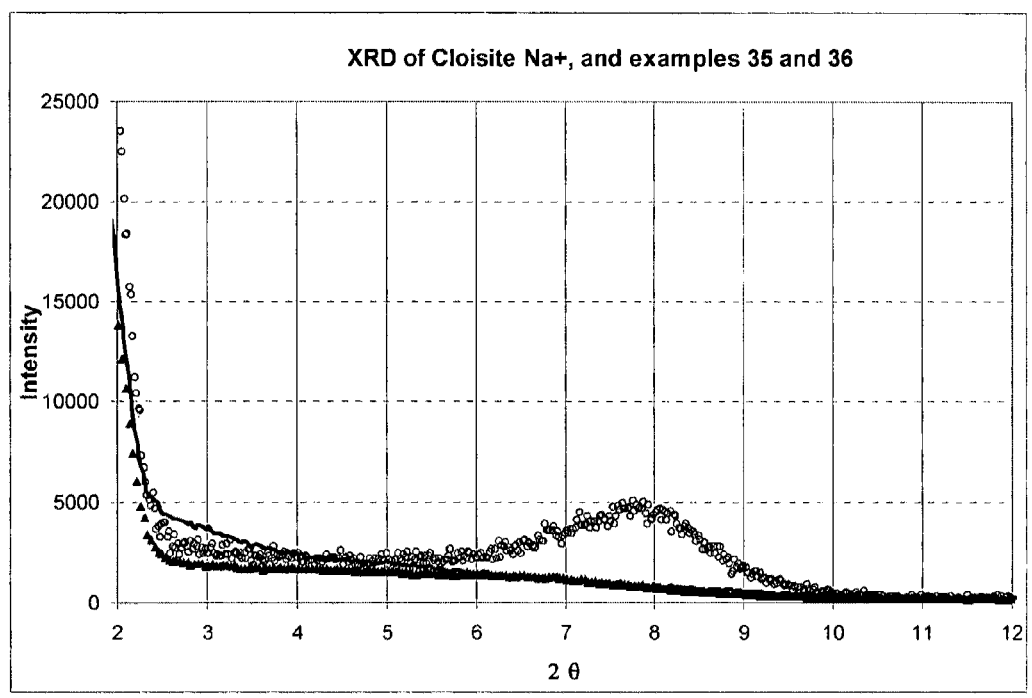
FIG. 3 is a X-ray diffractogram for examples 35 and 36 and Cloisite Na+.
Figure 4:
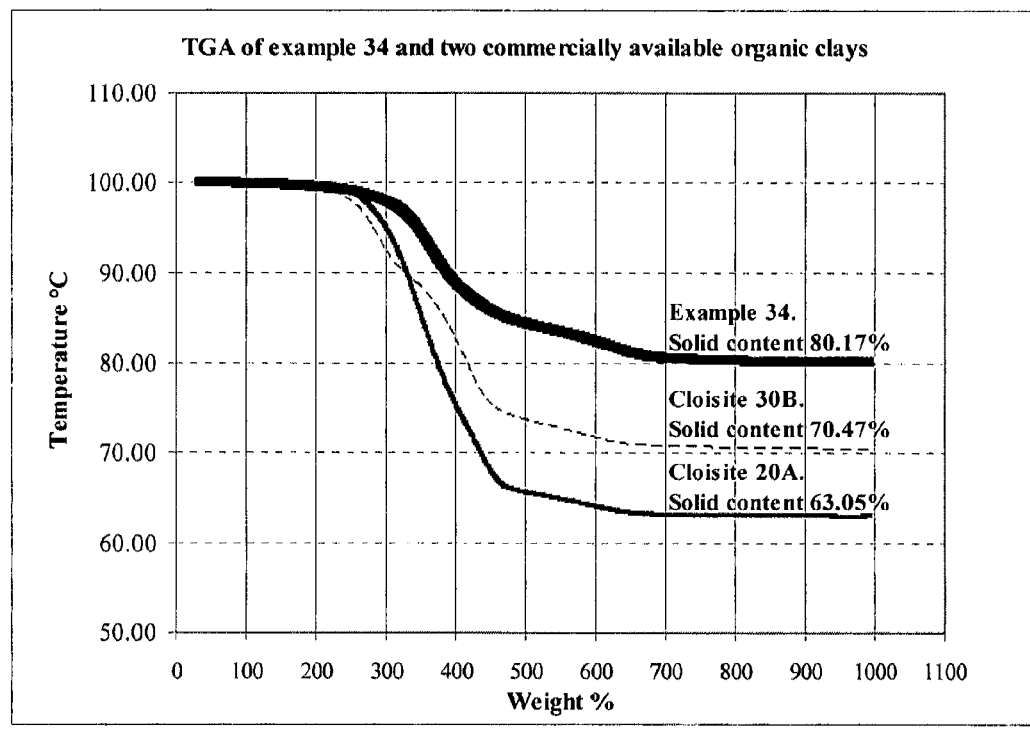
FIG. 4 is a thermogravimetric analysis of example 35 and two commercially-available clays.

In contrast with the prior art, the inventors discovered, unexpectedly, that block copolymers that include a first block, which comprises monomeric units of a functionalized acrylic and/or functionalized vinyl monomer and monomeric units of a vinyl monomer, and a second block, which comprises monomeric units of one or more vinyl monomers and monomeric units of the functionalized acrylic and/or functionalized vinyl monomer from the first block, can improve the compatibility between organic clays and thermoplastic or thermoset polymeric matrices. Details of the parent invention are set forth in U.S. patent application Ser. No. 11/508,407, filed Aug. 23, 2006, which is incorporated by reference for all purposes.

The mechanism by which these block copolymers improve the compatibility of an organic clay with a polymeric matrix is related to the way the structure of the block copolymer interacts with different chemical moieties present in polymer/clay composites. One block of the copolymer is designed to have favorable chemical or physical interactions with the organic clay of the composition, while the remaining block is designed to be miscible or reactive either towards the thermoplastic matrix, a functionalized olefin or one of the components of the thermoset matrix.

In one embodiment, the present invention provides a method for preparing polymer/clay nanocomposites by mixing together:
 a) an organic clay;
 b) a block copolymer with a composition that includes a first block, which comprises monomeric units of a functionalized acrylic and/or functionalized vinyl monomer and monomeric units of a vinyl monomer, and a second block, which comprises monomeric units of one or more vinyl monomers and monomeric units of the functionalized acrylic and/or functionalized vinyl monomer from the first block; and
 c) a thermoplastic matrix. Optionally, a functionalized polyolefin can be added to the mix.

The inventors have unexpectedly found that in order to exfoliate a clay into a thermoplastic matrix it is preferable to mix the organoclay with a functionalized block copolymer. This mixture enhances the interaction of the organic cation (quaternary ammonium salt) intercalated in the clay and the chemical moieties of the block copolymer.

In one embodiment, the organic clay (a) and the block copolymer (b) are mixed in a ratio between the clay and the block copolymer of between 100:1 and 1:1000, preferably between 100:5 and 1:600 and more preferably between 100:30 and 1:5. In another embodiment, the ratio of clay to block copolymer is between 2:1 and 1:2, and in a specific embodiment, the organic clay (a) and the block copolymer (b) are mixed in a ratio between the clay and the block copolymer of 1:1.

The clay and the block copolymer can be mixed by bringing them in solution or by melt mixing the block copolymer with the clay. If the clay and the block copolymer are melt mixed to form a nanocomposite concentrate, preferably the mixing equipment is a co-rotating twin-screw extruder. The extruder should be capable of screw speeds ranging from about 50 to about 2,000 rpm. The temperature profile from the barrel number two to the die should range from the melting temperature of the thermoplastic matrix polymer to about 300° C., typically between 180° C. to around 300° C., preferably between 180° C. and 250° C. and more preferably between 190° C. and 220° C. The nanocomposites concentrate can be pulverized or pelletized for later use.

The nanocomposite concentrate can then be either directly incorporated into the thermoplastic polymeric matrix or optionally reacted with a functionalized polyolefin to form a polyolefin master batch.

In the first case, the block copolymer of the nanocomposite concentrate interacts with the thermoplastic matrix either by reacting with the thermoplastic polymeric matrix or by intermolecular forces or weak interactions (dipole-dipole interactions including hydrogen bonding, dipole-induced dipole, London forces, transitory forces or van der Waals' forces) when the polarity of the block copolymer is similar to the polarity of the thermoplastic and both components are miscible.

In the second case, the nanocomposite concentrate can be reacted with a functionalized polyolefin, forming a polyolefin masterbatch that can be easily dispersed into a thermoplastic matrix to render a nanocomposite with improved properties. This strategy is especially useful for the case of polypropylene-clay nanocomposites, where a maleic anhydride grafted polyolefin is typically added as a compatibilizer to improve compatibility between the clay and the polymeric matrix. In the present invention, the addition of the block copolymer has several advantages: 1) It improves miscibility between the polypropylene matrix and the organic clay by forming comb or block copolymers with the functional polyolefin. This improvement is reflected in better intercalated clays, the presence of a larger amount of exfoliated clay and an improvement in mechanical properties; and 2) The amount of the compatibilizer can be dramatically reduced. Typical compatibilizers used in polypropylene nanocomposites are low molecular weight compounds, thus their incorporation into a polypropylene matrix usually causes a detriment in mechanical properties of the whole composite, and it also increases significantly the cost of the final product. In the present invention, the maleic anhydride grafted polyolefin is added in a low concentration, and therefore mechanical properties are less affected by the presence of this component.

When a functionalized polyolefin is used in the composition, the reaction step between the mixture of nanoclay/block copolymer and the functionalized polyolefin is important, since it defines the final degree of dispersion (exfoliation) of the final composite. The block copolymer contains typically reactive groups that can react with the functional groups of the functional polyolefins. When the polyolefin has grafted functional groups, the block copolymer will react with these groups and produce a comb copolymer with a polyolefin backbone that is miscible with polyolefin matrices and one or more grafted block copolymers, which possess one block miscible or reactive with the organic clay. When the polyolefin has terminal functional groups, its reaction with the block copolymer will produce another block copolymer possessing one polyolefin block, which is miscible with polyolefin matrices, and another block miscible, reactive or compatible with the organic clay. In the case of the maleic anhydride functional polyolefins, we have found that a previous treatment in the presence of catalytic amounts of acids, preferably Lewis acids, improves its reactivity towards the functional block copolymer. Preferably, the pre-treatment includes water, either as crystallization molecules included in the acid molecule or as an additional component. The ratio between the acid molecule and additional water is preferably between 0.1 and 5. The maleic anhydride functional polyolefin is preferably treated with 0.01% to about 10% acid by weight. The catalyst can be either used to pre-treat the functional polyolefin or added directly when the clay-block copolymer mixture is incorporated with the functional polyolefin. If the block copolymer has an anhydride as the functional group and the functional polyolefin has other functional groups such as epoxy, the catalyst can also be used to pre-treat the block copolymer-clay mixture or added directly when the functional polyolefin is incorporated.

In one embodiment of the present invention, an organic clay (a) and a block copolymer (b) are mixed to form a nanocomposite master batch in a ratio of organic clay to block copolymer of between 100:1 and 1:1000, preferably between 100:3 and 1:800 and most preferably between 100:5 and 1:600. The organic clay and the block copolymer can be mixed by bringing them in solution or by melt mixing the block copolymer with the clay. If the organic clay and the block copolymer are melt mixed to form a nanocomposite master batch, preferably, the mixing equipment is a co-rotating twin-screw extruder. The extruder should be capable of screw speeds ranging from about 50 to about 2,000 rpm. The temperature profile from the barrel number two to the die should range from the melting temperature of the thermoplastic matrix polymer to about 270° C. and preferably from around 200° C. The nanocomposites master batch can be pulverized or pelletized for later use.

In a specific embodiment, the nanocomposite master batch can be diluted in any ratio that one skilled in the art desires to yield as a final nanoclay concentration in a thermoplastic polymer matrix. One way of dilution is with a twin-screw extruder from any number of sources or a continuous mixer. Another way of dilution is mixing the nanocomposites master batch pellets or powder at the point of molding the final article. The amount of organic clay incorporated in the thermoplastic or thermoset polymer is between 0.05% and 80%, preferably between 0.5% and 60% and more preferably between 0.5% and 45% by weight. In one embodiment the concentration of organic clay in the thermoplastic matrix is between 1 and 25% wt, and in another it is between 3 and 18% wt.

In a specific embodiment, the nanocomposite master batch can be diluted in any ratio that one skilled in the art desires to yield as a final nanoclay concentration in a functional polyolefin matrix. One way of dilution is with a twin-screw extruder from any number of sources or a continuous mixer. Another way of dilution is mixing the nanocomposites master batch pellets or powder at the point of molding the final article. The amount of clay incorporated in the thermoplastic or thermoset polymer is between 0.5% and 80%, preferably between 1% and 30% and more preferably between 1% and 10% by weight.

In another embodiment, the organic clay (a), the block copolymer (b) and a thermoplastic polymer are mixed using an amount of organic clay between 0.05% and 80%, preferably between 0.5% and 50% and more preferably between 0.5% and 20 wt. %. The ratio between the clay and the block copolymer is between 100:1 and 1:1000, preferably between 100:3 and 1:800 and more preferably between 100:5 and 1:600. In one embodiment, the organic clay (a), the block copolymer (b) and a thermoplastic polymer are mixed using an amount of organic clay between 1% wt and 20% wt. The ratio between the clay and the block copolymer is between 10:3 and 1:5. In another embodiment, the organic clay (a), the block copolymer (b) and a thermoplastic polymer are mixed using an amount of organic clay between 3% wt to 15% wt, and an amount of block copolymer between 1.5% wt to 30% wt and an amount of thermoplastic polymer between 55% wt and 95.5% wt.

The components can be mixed by bringing them in solution or by melt mixing the block copolymer and the thermoplastic polymer with the clay. If the organic clay and the block copolymer are melt mixed to form a nanocomposite master batch, preferably, the mixing equipment is a co-rotating twin-screw extruder. The extruder should be capable of screw speeds ranging from about 50 to about 2,000 rpm.

In another embodiment, the organic clay (a), the block copolymer (b) and a functional polyolefin are mixed using an amount of organic clay between 0.05% and 80%, preferably between 0.5% and 60% and more preferably between 0.5% and 40% by wt. The ratio between the clay and the compatibilizer is between 100:1 and 1:1000, preferably between 100:3 and 1:800 and more preferably between 100:5 and 1:600. The components can be mixed in solution or melt mixed. If the clay and the block copolymer are melt mixed, preferably, the mixing equipment is a co-rotating twin-screw extruder. The product can be pelletized or pulverized for its use as a polyolefin nanocomposite master batch.

In a specific embodiment, the organic clay (a), the block copolymer (b) and a functional polyolefin are mixed using an amount of organic clay between 3% wt and 25% wt, an amount of block copolymer between 1.5% and 50% and an amount of functional polyolefin between 25% wt and 95.5%.

In a more specific embodiment, the organic clay (a), the block copolymer (b) and a functional polyolefin are mixed using an amount of organic clay between 8% wt and 15% wt, an amount of block copolymer between 16% and 30% and an amount of functional polyolefin between 55% wt and 76% wt.

In another embodiment, the functional polyolefin is previously treated with 0.5-10% wt of an acid molecule, and optionally with 0.5-20% wt of water, preferably with 0.5-5% wt of an acid molecule and 0.5-10% wt of water. The acid is preferably a Lewis acid. Zinc acetate can be used as the Lewis acid.

The functional polyolefin can be mixed with the acid by bringing them in solution or by melt mixing. If they are melt mixed, the mixing equipment is preferably a co-rotating twin-screw extruder. The temperature is between 110° C. and 200° C., preferably between 130° C. and 180° C., and more preferably between 130° C. and 160° C.

In one embodiment the polyolefin nanocomposite master batch can be used to modify polyolefins. The polyolefin nanocomposite master batch can be melt mixed with the polyolefin, and preferably, the mixing equipment is a co-rotating twin-screw extruder. The amount of organic clay incorporated in the polyolefin is between 0.05% and 80%, preferably between 0.5% and 60% and more preferably between 0.5% and 45%. In one case, the amount of clay incorporated in the polyolefin is between 3% wt and 20% wt.

In a specific embodiment the composition of the polyolefin/clay nanocomposite is: from 3% wt to 10% wt of the organic clay, from 1.5% wt to 20% wt of the block copolymer, from 1.5 to 50% wt of the functional polyolefin and from 20 to 94% wt of a polyolefin. In another embodiment, the composition of the polyolefin/clay nanocomposite is: from 3% wt to 8% wt of the organic clay, from 3% wt to 10% wt of the block copolymer, from 2% wt to 20% wt of the functional polyolefin and from 62 to 92% wt of a polyolefin.

In a more specific embodiment, the organic clay is an organic montmorillonite, the functional acrylic monomer in the block copolymer is glycidyl methacrylate, the functional polyolefin is a maleated polyolefin, the Lewis acid is zinc acetate, and the thermoplastic polymer is polypropylene. Preferably, the organic clay is an organic montmorillonite ranging from 3 wt % to 10 wt %, the functional acrylic monomer in the block copolymer is glycidyl methacrylate and the block copolymer ranges from 3 wt % to 10 wt %, the functional polyolefin is a maleated polyolefin ranging from 2 wt % to 20 wt %, the Lewis acid is zinc acetate, and the thermoplastic polymer is polypropylene in the range of 62 wt % to 92 wt %.

In another embodiment, the organic clay (a), the block copolymer (b), the thermoplastic matrix (d) and the functionalized polyolefin (e) are mixed using an amount of organic clay between 0.05% and 80%, preferably between 0.5% and 60% and more preferably between 0.5% and 45% by weight. The ratio between the clay and the block copolymer is between 100:1 and 1:1000, preferably between 100:3 and 1:800 and more preferably between 100:5 and 1:600. The amount of functionalized polyolefin in the thermoplastic matrix is between 1% and 80%, preferably between 2% and 50% and more preferably between 2% and 25 wt. %.

In a more specific embodiment, the amount of organic clay is between 2% wt and 20% wt, the ratio between the clay and the block copolymer is between 100:30 to 1:5 and the amount of functional polyolefin in the thermoplastic matrix is between 5 and 20% wt.

In another embodiment, the functional polyolefin is previously treated with 0.5-10% wt of an acid molecule, and optionally with 0.5-20% wt of water, preferably with 0.5-5% wt of an acid molecule and 0.5-10% wt of water.

Examples of functional groups contained in the functionalized polyolefin include, but are not limited to, anhydride, epoxy, hydroxy, amine and acid. The components can be melt mixed, and preferably, the mixing equipment is a co-rotating twin-screw extruder. The thermoplastic matrix is preferably a polyolefin.

The organic clay of the present invention can be any natural, synthetic or modified clay intercalated with an intercalant and mixtures thereof. The clay has preferably a cation exchange capacity of between about 30 and about 300 milliequivalents per 100 g. Examples of natural clay minerals include the families of smectite (such as montmorillonite, saponite, beidellite, nontronite, hectorite and stevensite) vermiculite, mica, chlorite and halloysite. Examples of synthetic clays include for example, synthetic mica, synthetic saponite, hectorite, laponite, fluorhectorite, hydroxyl hectorite, boron fluophlogophite, hydroxyl boron phlogopite, and solid solutions among those and between those and structurally compatible natural silicates selected from the group consisting of talc, fluortalc, polylithionite, fluorpolylithionite, phlogapite, and fluorphlogopite. Modified clays include fluorinated montmorillonite, fluorinated mica and the like. The clay mineral is composed of layered silicate and this layered silicate imparts good mechanical properties and heat resistance to the polymer material. These layered silicates are negatively charged on account of the iomorphous ion exchange. They differ from one another in characteristic properties depending on the density and distribution of negative charge.

Organic clays are clays containing organic or semi-organic chemicals capable of entering the clay gallery and bonding to the surface. Suitable organic intercalants are organic cations such as substituted ammonium ions, e.g., octadecyl dimethyl ammonium ion or dodecylammonium ion or other mono or di C8-C18 alkylammonium ion or where substitution is by —R—COOH wherein R denotes an alkylene group which contain phenylene, vinylene, branching and or other linkages, e.g., 12-aminododecanoic acid ion, or orgabophosphonium ions, e.g., C8-C18 alkylphosphonium ion or organosulfonium ions, e.g., C8-C18 alkylsulflnium ions. More detail about organic clays can be found in the following documents: Nam, J. B.; Wang, D.; Wilkie, C. A. Macromolecules 2005, 38, 6533-6543; U.S. Pat. No. 5,747,560, issued to Christiani et al.; U.S. Pat. No. 5,663,111, issued to Gadberry et al. and incorporated by reference; U.S. Patent Application Pub. No. 2002/0037953 filed by Lan et al. and incorporated by reference; and in advertising brochures and web pages of organic clays producers Southern Clay Products Inc. (http://www.nanoclay.com/) under the trade name of Cloisite®, Süd-Chemie Inc. (http://www.sud-chemie.com) under the trade name of Nanofil® and Nanocor, a subsidiary of AMCOL International Corporation, (http://www.nanocor.com) under the trade name of Nanomer®.

The block copolymer (b) of the present invention can be synthesized as described in the parent patent document. The parent patent document describes a process for producing a block copolymer, comprising reacting an acrylic monomer having functional groups and one or more vinyl monomers in the presence of a free radical initiator and a stable free radical in a first step to form a reaction product, wherein the reaction product includes residual unreacted acrylic monomer; and reacting in a second step one or more vinyl monomers with the reaction product from the first step to form a second block, wherein the second block incorporates the residual unreacted acrylic monomer. In the present invention the first block can include not only acrylic monomer that has functional groups but also, more generally, vinyl monomer that has functional groups. The first block can have one or the other or both of acrylic monomer or vinyl monomer, each with functional groups. It is appreciated that an acrylic monomer is a vinyl monomer, but both terms are used for the sake of clarity.

The block copolymer (b) preferably has a first block of a random copolymer with a total length between 1 and 720 monomeric units and a second block that incorporates residual monomers left over from polymerizing the first block and one or more additional monomers, where the second block has a length between 100 and 2000 monomeric units. The functional groups contained in the functional vinyl (—C=C—) or functional acrylic (C=C—CO—) monomers include, but are not limited to, epoxy, acid, anhydride, amine, amide and hydroxyl groups. Preferred functional vinyl monomers are functional aromatic vinyl monomers. Preferred acrylic monomers that have functional groups include glycidyl methacrylate, acrylic acid, methacrylic acid, 2-hydroxyethyl methacrylate, maleic anhydride, 2-dimethylaminoethyl methacrylate and 2-diethylaminoethyl methacrylate.

Examples of vinyl monomers contained in the block copolymer are styrene, substituted styrenes, substituted styrenes, ethylene, isoprene, isobutylene, butadiene, acrylates, methacrylates, alkyl substituted acrylates, aryl substituted acrylates, alkyl substituted methacrylates, aryl substituted methacrylates, acrylonitrile, maleic anhydride, acrylonitrile, N-aromatic substituted maleimides, N-alkyl substituted maleimides, acrylic acid, methyl methacrylate, and 2-hydroxyethyl methacrylate.

In one embodiment, the functional acrylic monomer is glycidyl methacrylate, and the vinyl monomer is styrene. In one embodiment, the functional acrylic monomer is acrylic acid, and the vinyl monomer is styrene.

The thermoplastic matrix polymer can be any thermoplastic suitable for molding or extruding operations where lightness, stiffness and toughness are desired as performance properties. Non-limiting examples of such polymers are polyolefins, polyamides, polyesters, polyurethanes, styrenic polymers, polycarbonates, polyvinyl halides and combinations thereof.

Preferably, the mixing equipment is a co-rotating twin-screw extruder. The extruder should be capable of screw speeds ranging from about 50 to about 2,000 rpm. The temperature profile from the barrel number two to the die should range from the melting temperature of the thermoplastic matrix polymer to about 270° C. and preferably from around 200° C. The nanocomposites can be pulverized or pelletized for later use.

Those skilled in the art of preparing polymer-clay composites recognize the need to add optional components to a nanocomposite formulation. Such optional ingredients in the present invention include colorants (dyes or pigments), nucleating agents or nucleators, blowing agents, impact modifiers, chain extenders, antistatic agents, activators that lower the activation temperature of the blowing agent, surfactants, plasticizers, stabilizers, flame retardants, UV absorbers, fillers, fragrances, mold release aids, processing aids, biocides, antistatic additives, anti-microbial agents, lubricants and combinations thereof.

In another embodiment, the present invention provides a method for preparing polymer/clay nanocomposites by incorporating:

a) an organic clay;
b) a block copolymer with a composition that includes a first block, which comprises monomeric units of a functionalized acrylic or functionalized vinyl monomer and monomeric units of a vinyl monomer, and a second block, which comprises monomeric units of one or more vinyl monomers and monomeric units of the functionalized acrylic or functionalized vinyl monomer from the first block; and
c) one or more components that can polymerize to render a thermoset matrix.

The inventors found unexpectedly that the dispersion (exfoliation) of organic nanoclays in thermoset matrices can be improved by the incorporation of a block copolymer containing reactive groups according to the present invention. This block copolymer can react with the components (monomers, oligomers and/or polymers) that render thermoset matrices and also interact with the organoclay, thus improving its dispersion in thermoset polymers.

In one embodiment, the organic clay (a) the block copolymer (b) and one or more different components that can polymerize to render thermoset matrices (c) are mixed in bulk or solution. The ratio between the organic clay and the block copolymer is between 100:1 and 1:1000, preferably between 100:3 and 1:800 and more preferably between 100:5 and 1:600. The amount of organic clay relative to the total amount of monomers added is between 0.05% and 80%, preferably between 0.5% and 60% and more preferably between 0.5% and 45% by weight.

In one embodiment the ratio between the organic clay and the block copolymer is between 10:3 and 1:10, preferably between 10:3 and 1:5, and the amount of organic clay relative to the total amount of monomers added is between 1% and 30%, preferably between 3% and 20% by weight.

In another embodiment, the organic clay (a) and the block copolymer (b) are mixed in a ratio between 100:1 and 1:1000, preferably between 100:3 and 1:800 and more preferably between 100:5 and 1:600. The organic clay and the block copolymer can be mixed by bringing them in solution or by melt mixing the block copolymer with the clay. If the clay and the block copolymer are melt mixed to form a nanocomposite concentrate, the mixing equipment is preferably a co-rotating twin-screw extruder. The extruder should be capable of screw speeds ranging from about 50 to about 2,000 rpm. The temperature profile from the barrel number two to the die should range from the melting temperature of the thermoplastic matrix polymer to about 270° C. and preferably from around 200° C. The nanocomposite concentrate can be pulverized or pelletized and then mixed with one or more different components that can polymerize to render thermoset matrices (c). The ratio between the organic clay and the block copolymer is between 100:1 and 1:1000, preferably between 100:3 and 1:800 and most preferably between 100:5 and 1:600. The amount of organic clay relative to the total amount of monomers added is between 0.05% and 80%, preferably between 0.5% and 60% and most preferably between 0.5% and 45%.

In one embodiment the composition of the thermoset/clay nanocomposite is a clay content between 3% wt to 15% wt, a block copolymer content between 1.5% wt to 30% wt and an amount of components that can polymerize to render a thermoset matrix between 55% wt and 95.5% wt.

Thermoset matrices include but are not restricted to phenolic resins, epoxy resins, unsaturated polyester resins, alkyd resins, furan resins, urea resins, melamine resins, polyurethane resins and aniline resins. Polymerization of components that can polymerize to render a thermoset matrix is carried out in various ways depending on the type of monomer selected. In addition, this step permits the use of various solvents, catalysts and accelerators for polymerization.

Amphiphilic Block Copolymer

Another object of this invention is to provide a process for the modification of clay minerals by bringing into contact a layered clay mineral and a block copolymer that has a composition that includes a first block, which comprises monomeric units of a functionalized acrylic or functionalized vinyl monomer and monomeric units of a vinyl monomer, and a second block, which comprises monomeric units of one or more vinyl monomers and monomeric units of the functionalized acrylic or functionalized Vinyl monomer from the first block.

The block copolymer of the present invention can be formed with a block that is hydrophilic, which contains some degree of polarity so as to be miscible with the aqueous process for making clay, and another block that is compatible or miscible with the thermoplastic or thermoset resin with which the clay will be mixed. Clay producers have typically used an organic intercalant with substituted ammonium ions, organophosphonium ions and/or organosulfonium ions in a process for making clay. In order to mix the clay with a thermoplastic or thermoset resin, a compatibilizer was often needed. A typical compatibilizer that has been used is maleic anhydride grafted polypropylene. A block copolymer made according to the present invention can be used in the clay-production process instead of the organic intercalant that has been used in the past, and the block copolymer can also serve as a compatibilizer with the thermoplastic or thermoset resin, which can reduce or even eliminate the need for a separate compatibilizer such as maleic anhydride grafted polypropylene.

Some of the advantages of using the block copolymers of the present invention to modify clay minerals are:

1) Cation exchange is more time effective than when typical organic cations are used. The interaction of one positively charged monomer of the block copolymer with the clay mineral brings into near contact other positively charged monomers of the same block copolymer with another section of the clay mineral gallery, where as typical organic cations interact one by one with the surface making it a diffusion limited process. The effective interaction is also reflected in a low amount of extractable block copolymer, in contrast with organic cations which are usually present as a contaminant in organic clays and which are reported to cause a detriment in the material's properties. (U.S. Patent Application Pub. No. 2002/0037953 filed by Lan et al.)

2) Thermal stability is higher compared to organic cations with analogue cationic groups. In the case of block copolymers containing positively charged amines, the observed thermal stability is higher when compared with commercial organic clays possessing also positively charged amines.

3) In contrast with organic cations, block copolymers not only intercalate clay minerals, but they exfoliate almost 100% of the clay, separating the galleries even before the polymer matrix is incorporated and facilitating the incorporation of the polymer matrix with the individual clay platelets.

4) One block of the block copolymers is designed to be reactive or miscible with the polymeric matrix, optimizing the interaction between the clay and the matrix and eliminating the use of additional compatibilizers. Polypropylene modification by clays typically needs the use of a compatibilizer to match the polarity between organic clays and the polymer. The present invention eliminates the use of a compatibilizer, allowing a direct addition of the block copolymer modified clay to polypropylene.

5) In contrast with pure diblock copolymers described in prior art such U.S. Patent Application Pub. No. 20060160940 filed by Muhlebach et al., the presence of residual functional monomers in the block copolymers of the present invention help to improve solubility of the block copolymer in the dispersion media. This is especially important when the dispersion media is water, since the block miscible or reactive with the polymer matrix usually contains monomers with low polarity, which is not water soluble. The amount of residual functional monomers in the polymer miscible block can be adjusted in order to obtain an optimal balance between having a water soluble block copolymer and preserving the miscibility with the polymer matrix.

6) Block copolymers can be directly incorporated into the organic clays manufacturers' actual process, since they merely constitute a replacement of the current organic cations. They can be added directly to the clay slurry during or after its purification process, or they can be previously dissolved or dispersed in a dispersion medium, which is preferably water, and then added to the clay slurry.

In one embodiment, the clay mineral is purified as mentioned in U.S. Pat. No. 6,050,509, which includes the steps of separating the clay from rocks and other large non-clay impurities; dispersing the clay and smaller impurities in water, preferably at a concentration of at least about 4% by weight clay, based on the total weight of clay and water, more preferably about 6-10% by weight clay in water, to provide a clay slurry; passing the clay slurry through a series of hydrocyclones to remove the larger particles, considered impurities, while retaining clay particles having a size of about 100 microns or less, particularly about 80 microns or less; ion exchanging the clay to remove at least about 9% of the interlayer, multivalent cations (e.g., divalent and trivalent) cations in an ion exchange column, wherein the multivalent ions are replaced by monovalent cations such as sodium, lithium and/or hydrogen; optionally the clay may be converted via an aqueous reaction with a soluble sodium compound. The clay is then centrifuged to remove a majority of the particles having a size in the range of about 5 µm to about 100 µm.

In one embodiment, the clay mineral is purified as mentioned in U.S. Pat. No. 6,787,592 where the clay mineral is crushed, ground, slurried in water and screened to remove grit and other impurities. In an embodiment, the clay is converted to the sodium form if it is not already in this form. This may be effected, as known in the art, by a cation exchange reaction, or the clay may be converted via an aqueous reaction with a soluble sodium compound. The clay mineral is then subjected as a dilute (1 to 6% solids) aqueous slurry to high shearing in a suitable mill. In an embodiment, this shearing uses a homogenizing mill of the type wherein high speed fluid shear of the slurry is effected by passing the slurry at high velocities through a narrow gap, across which a high pressure differential is maintained. This type of action can be effected for example, in the well-known Manton-Gaulin mill, known also as the Gaulin homogenizer. (U.S. Pat. No. 4,664,842 and U.S. Pat. No. 5,110,501, assigned to Southern Clay Products.) The conditions for use of the Manton-Gaulin mill may, in an embodiment, be substantially as in the patents; e.g. the pressure differential across the gap is preferably in the range of from 70,300 to 562,400 g/cm2 with 140,600 to 351,550 g/cm2 being more typical in the representative operations. Depending upon the specifics of the equipment, pressures higher than 562,400 g/cm2 can readily be used. The slurry to be treated may be passed one or more times through the mill. Among additional instrumentalities which may be effectively used to provide high shearing of the clay component, is the rotor and stator arrangement described in U.S. Pat. No. 5,160,454. Following the high shear step, the slurry is either a) intermixed with the charged block copolymer of the present invention and the reaction slurry may again be subjected to high shearing by one or more passes through the mill or other mentioned instrumentalities or b) mixed with the neutral block copolymer of the present invention and then the pH of the reaction slurry can be adjusted, typically to an acid pH in order to protonate the block copolymer, making it capable of ion exchanging with the sodium ions of the clay and then the slurry may again be subjected to high shearing by one or more passes through the mill and other mentioned instrumentalities. The slurry is thereupon dewatered, and the block copolymer modified clay dried and ground to provide a dry clay modified product.

In one embodiment, a sepiolite and/or palygorskite are purified as mentioned in U.S. Pat. No. 6,036,765 where the clay mineral is crushed, ground, slurried in water and screened to remove grit and other impurities. A smectite clay mineral is subjected to a similar regimen. Each of the component minerals is then subjected as a dilute (1 to 6% solids) aqueous slurry to high shearing in a suitable mill. Most preferred for use in this shearing step is a homogenizing mill of the type wherein high speed fluid shear of the slurry is effected by passing the slurry at high velocities through a narrow gap, across which a high pressure differential is maintained. This type of action can be effected for example, in the well-known Manton-Gaulin mill, known also as the Gaulin homogenizer. (U.S. Pat. No. 4,664,842 and U.S. Pat. No. 5,110,501, assigned to Southern Clay Products.) The conditions for use of the Manton-Gaulin mill may, in an embodiment, be substantially as in the patents; e.g. the pressure differential across the gap is preferably in the range of from 70,300 to 562,400 g/cm2 with 140,600 to 351,550 g/cm2 being more typical in the representative operations. Depending upon the specifics of the equipment, pressures higher than 562,400 g/cm2 can readily be used. The slurry to be treated may be passed one or more times through the mill. Among additional instrumentalities which may be effectively used to provide high shearing of the clay component, is the rotor and stator arrangement described in U.S. Pat. No. 5,160,454. Following the high shearing step, the clay components slurries may be mixed with one another. Alternatively, the two or more clay components can be intermixed in a single slurry before the latter is subjected to the high shear step. Following such step the single slurry is intermixed either a) with the charged block copolymer of the present invention and the reaction slurry may again be subjected to high shearing by one or more passes through the mill or other mentioned instrumentalities or b) with the neutral block copolymer of the present invention and then the pH of the reaction slurry can be adjusted, typically to an acid pH in order to protonate the block copolymer, making it capable of ion exchanging with the sodium ions of the clay and then the slurry may again be subjected to high shearing by one or more passes through the mill and other mentioned instrumentalities. The slurry is thereupon dewatered, and the block copolymer modified clay dried and ground to provide a dry clay modified product.

In another embodiment the clay mineral may be subject to high energy pugmilling prior to the cation exchange reaction, as described in claim U.S. Pat. No. 4,569,923. This is preferably effected by extruding the clay at 25 to 40 weight percent moisture content, through a pugmill which imparts at least 20

HP hr/ton of energy to the clay, after which the clay is subjected to the prior art processing.

In a preferred embodiment the block copolymer functional acrylic or functional vinyl monomers are monomers that can be polymerized using controlled radical polymerization containing positively charged monomers or monomers that upon pH change become positively charged. Examples of functional groups contained in functional acrylic or functional vinyl monomers include ammonium, alkyl ammonium, aryl ammonium (—N+R(3−n−m)ArmHn where (n+m)≦3), aryl and alkyl phosphonium (—P+R(3-n-m)ArmHn where (n+m)≦3), aryl and alkyl sulfonium (—S+R(2−n−m)ArmHn where (n+m)≦2), substituted ammonium, (—N+X1X2X3) phosphonium (—P+X1X2X3), or sulfonium (—S+X1X2), wherein X1, X2 and X3 are each individually H or a C1-C20 group selected from alkyl, aryl, perfluoroalkyl, arylalkyl, alkylaryl and any of these substituted with one or more oxygen, nitrogen, chlorine, fluorine, bromine, iodine, sulfur and phosphorous. The term "alkyl" refers to linear or branched saturated hydrocarbon substituents having from one to about twenty carbon atoms, or preferably, one to about twelve carbon atoms. Alkyl substituents may themselves be substituted with one or more substituents such as alkoxy, hydroxyl, amino, halo, nitro, acyl, cyano, carboxy, and thioalkyl, for example. The term "aryl" refers to a carbocyclic aromatic system containing one or more rings which may be attached together in a pendant manner or may be fused, such as phenyl, naphtyl, indane. Aryl substituents may also be substituted with one or more substituents such as alkyl, haloalkyl, alkoxy, hydroxyl, amino, halo, nitro, alkylamino, acyl, cyano, carboxy, thioalkyl, and alkoxycarbonyl. Other quaternary ammonium moieties include, but are not limited to, imidazolium, triazolium and substituted derivatives thereof. Substitution of the imidazolium or triazolium group may be with any of a variety of alkyl, aryl, arylalkyl or alkylaryl groups, and-or substitution may be in the form of one or more fused rings. Other phosphonium groups include 1 to 4 aryl substituents.

In one embodiment the second block of the block copolymer comprises vinyl monomers which also bear functional groups. Non-limiting examples of functional groups are acid, hydroxyl, epoxy, and amino.

The hydrophilic block copolymer of the present invention can be synthesized as described in the parent patent document, using one of the controlled radical polymerization techniques. In a preferred embodiment of the present invention, the hydrophilic block copolymers are synthesized using a Reversible Addition-Fragmentation Transfer (RAFT) reaction, comprising reacting an acrylic monomer having functional groups and one or more vinyl monomers in the presence of a free radical initiator and a RAFT agent in a first step to form a reaction product, wherein the reaction product includes residual unreacted acrylic monomer; and reacting in a second step one or more vinyl monomers with the reaction product from the first step to form a second block, wherein the second block incorporates the residual unreacted acrylic monomer. In a more specific embodiment the RAFT agent used to synthesize the hydrophilic block copolymers is dibenzyl trithiocarbonate. In the present invention the first block can include not only acrylic monomer that has functional groups but also, more generally, vinyl monomer that has functional groups. The first block can have one or the other or both of acrylic monomer or vinyl monomer, each with functional groups. It is appreciated that an acrylic monomer is a vinyl monomer, but both terms are used for the sake of clarity.

The clay mineral has a cation exchange capacity of preferably 30 to 300 milliequivalents per 100 g. Examples of natural clay minerals include the families of smectite (such as montmorillonite, saponite, beidellite, nontronite, hectorite and stevensite), vermiculite, mica, chlorite and halloysite. Examples of synthetic clays include, for example, synthetic mica, synthetic saponite, hectorite, laponite, fluorhectorite, hydroxyl hectorite, boron fluophlogophite, hydroxyl boron phlogopite, and solid solutions among those and between those and structurally compatible natural silicates selected from the group consisting of talc, fluortalc, polylithionite, fluorpolylithionite, phlogapite, and fluorphlogopite. Modified clays include fluorinated montmorillonite, fluorinated mica and the like. The clay mineral is composed of layered silicate, and this layered silicate imparts good mechanical properties and heat resistance to the polymer material. These layered silicates are negatively charged on account of the iomorphous ion exchange. They differ from one another in characteristic properties depending on the density and distribution of negative charge. With a clay mineral whose cation exchange capacity exceeds 300 milliequivalents per 100 g, its interlayer bonding force is too strong to give intended composite materials. If the capacity is less than 30 milliequivalent per 10 g, on the other hand, ion exchange or adsorption of block copolymer, which is an important step in the process of this invention, will not be sufficient, making it difficult to produce composite materials. The clay used in the present invention may be purified by any of the processes described in prior art such as U.S. Pat. No. 6,737,464, issued to Bagrodia et al.; and U.S. Pat. No. 6,050,509, issued to Clarey et al. and incorporated by reference.

One procedure to modify the clay comprises two steps: 1) the addition of the neutral block copolymer to the clay mineral dispersed in a dispersion medium, and 2) modification of the pH in order to protonate at least one monomer of the block copolymer and exchange the inorganic positive ions contained originally in the clay.

In one embodiment the first and the second steps are carried out with stirring. Stirring speeds are between 10 and 1000 rpm, preferably between 100 and 800 rpm. In a specific embodiment other cationic species can be added in step 1. In another specific embodiment, the neutral block copolymer of the first step is suspended, dissolved or dispersed in a dispersion medium before adding it to the clay.

In this procedure, the block copolymer functional acrylic or vinyl monomers are added in their neutral form, for example, amines. After the block copolymer is added to the clay mineral dispersed in a dispersion medium, the pH is modified, typically to low pH (1-3), in order to protonate the functional groups and obtain cationic species. In the case of amines, a change to low pH produces ammonium ions. The pH can be modified using any acid that is soluble in the dispersion medium and that has a pKa adequate for lowering the pH enough to protonate the block copolymer functional groups. A strong mineral acid can be used, such as hydrochloric acid.

The optional addition of other cationic species has the advantages of improving the thermal properties of the block copolymer modified clays and of reducing the price of the modified clay, since some intercalants are cheaper than the block copolymer. For example, phosphonium and/or sulfonium cations can be added to the clay mineral. The ratio between the amount of block copolymer and the cationic species added can be between 10:1 and 10:5.

Another procedure to modify the clay mineral comprises the addition of a charged block copolymer to the clay mineral dispersed in a dispersion medium. In one embodiment the charged block copolymer is added to the clay mineral with stirring. Stirring speeds are between 10 and 1000 rpm, preferably between 100 and 800 rpm. In a specific embodiment other cationic species can be added. In another embodiment, the charged block copolymer is suspended, dissolved or dispersed in a dispersion medium before adding it to the clay. This procedure can be carried out with or without stirring. Optionally, other cationic species can be added together with the block copolymer.

The charged block copolymer can be obtained by protonating a solution or suspension of the neutral block copolymer in a dispersion medium. The block copolymer can be protonated by lowering the pH of the dispersion medium, using an acid molecule. The acid is preferably a strong mineral acid. The charged block copolymer can be either isolated from the dispersion medium by evaporating the dispersion medium or used directly to modify the clay mineral dispersed in a dispersion medium.

The preferred dispersion medium is one that disperses the clay mineral uniformly and exhibits good miscibility with the block copolymer. Examples of the dispersion medium include water, methanol, ethanol, propanol, isopropanol, ethyleneglycol, 1,4-butanediol, glycerin, dimethyl sulfoxide, N,N-dimethylformamide, acetic aci, formic acid, pyridine, aniline, phenol, nitrobenzene, acetonitrile, acetone, methyl ethyl ketone, chloroform, carbon disulfide, propylene carbonate, 2-methoxyethanol, ether, carbon tetrachloride, and n-hexane, alone or in combination with one another.

Additional cationic species are inorganic or organic cations such as substituted ammonium ions, e.g., octadecyl dimethyl ammonium ion or dodecylammonium ion or other mono or di C8-C18 alkylammonium ion or where substitution is by —R—COOH wherein R denotes an alkylene group which contain phenylene, vinylene, branching and or other linkages, e.g., 12-aminododecanoic acid ion, or organophosphonium ions, e.g., C8-C18 alkylphosphonium ion or organosulfonium ions, e.g., C8-C18 alkylsulfinium ions. Inorganic cations can also be incorporated as additional cationic species. Examples of inorganic cations include, but are not limited to, $Ti(OC_3H_7)_4$, $Zr(OC_3H_7)_4$, $PO(OCH_3)_3$, $PO(OC_2H_3)_3$, $B(OCH_3)_3$, $B(OC_2H_5)_3$. Considering the total amount of positive charges provided by the cationic species and the block copolymer as 100%, at least about 50% of the positive charges are provided by the block copolymer, preferably at least about 70% of the positive charges are provided by the block copolymer and more preferably, at least about 80% of the positive charges are provided by the block copolymer.

Ion-exchange is important in the process of this invention. In this process all or part of the cations usually existing in natural and synthetic clays such as $Na^+$, $Ca^{2+}$, $K^+$ and $Mg^{2+}$ are exchanged by the positive moieties contained in the block copolymer. In this process, the block copolymer expands the interlayer distance of the clay mineral.

In some aspects of the current invention, the cation exchange process may be carried out by dispersing the clay mineral or mixture of clays into hot water, preferably between about 35 and about 10° C., more preferably from about 50 to about 90° C., at a concentration of clay mineral in water from about 3% to about 20%, preferably from about 3% to about 15% by weight, and then adding (neat or dissolved in a dispersion medium) the block copolymer and optionally additional cationic species, then agitating and/or blending for a period of time sufficient for the organic cations to exchange most of the metal cations present in the galleries between the layers of the clay material(s). It is possible to employ essentially the exact amount or some excess quantities of the total positive charges as compared to the ion exchange capacity of the clay material.

After cation exchange has been achieved, the material can be either directly used or it may also be used after the dispersion medium has been completely or partially removed by methods known in the art including, but not limited to filtration, vacuum filtration, centrifugal separation, decantation, evaporation and their combinations. The clay modified by the block copolymer can be directly mixed with a molten thermoplastic polymer to form polymer nanocomposites. Alternatively, the clay modified by the block copolymer can be mixed with one or more monomers, one or more components that can polymerize to render a thermoset matrix and optionally one or more solvents to form polymer nanocomposites. Monomers and one or more components that can polymerize to render a thermoset matrix can be further polymerized to form thermosets or thermoplastic oligomers or polymers.

Examples of thermoplastic polymers include, but are not restricted to, hydrogenated or partially hydrogenated homopolymers, and random, tapered, or block polymers (copolymers, including terpolymers, tetrapolymers, etc.) of conjugated dienes and/or monovinyl aromatic compounds. The conjugated dienes include isoprene, butadiene, 2,3-dimethylbutadiene and/or mixtures thereof. The monovinyl aromatic compounds include any of the following and mixtures thereof: monovinyl monoaromatic compounds, such as styrene or alkylated styrenes substituted at the alpha-carbon atoms of the styrene, such as alpha-methylstyrene, or at ring carbons, such as o-, m-, p-methylstyrene, ethylstyrene, propylstyrene, isopropylstyrene, butylstyrene, isobutylstyrene, tert-butylstyrene (e.g., p-tertbutylstyrene). Also included are vinylxylenes, methylethyl styrenes, and ethylvinylstyrenes. Specific examples include random polymers of butadiene and/or isoprene and polymers of isoprene and/or butadiene and styrene, acrylonitrile-styrene-butadiene copolymers, and also estero-specific polymers such as syndiotactic polystyrene.

Typical thermoplastic block copolymers include polystyrene-polyisoprene, polystyrene-polybutadiene, polystyrene-polybutadiene-polystyrene, polystyrene-ethylene butylene-polystyrene, polyvinyl cyclohexane-hydrogenated polyisoprene, and polyvinyl cyclohexane-hydrogenated polybutadiene. Tapered polymers include those of the previous monomers prepared by methods known in the art. Other non-styrenic polymers miscible or compatible with the second block of the copolymer include, but are not limited to, polyphenylene ether (PPE), polyvinyl methyl ether and tetramethyl polycarbonate, methyl methacrylate, alkyl substituted acrylates, alkyl substituted methacrylates and their copolymers with styrene, vinyl chloride, and vinylidene chloride. It also comprises polyolefins, where the term polyolefin is defined as a polymer the majority of whose monomers are olefins and may be polyethylene, polypropylene or copolymers of ethylene and either propylene or vinyl acetate. It also comprises engineering thermoplastic such as aliphatic and aromatic polycarbonates (such as bisphenol A polycarbonate), polyesters (such as poly(butylene terephthalate) and poly(ethylene terephthalate)), polyamides (e.g., nylons, such as nylon-6 (polycarpolactam), nylon-66 (polyhexamethylene adipamide)), nylon-11, nylon-12, nylon-46, nylon-7 or nylon-8), polyimides, polyacetal, polyphenylene ether or mixtures thereof polyamides, polyphenylene sulfides, polysulfones, polyether sulfones, vinylidene polymers (e.g., poly(vinylidene fluoride) and poly(vinlidenechloride)), fluoropolymers (e.g., polytetrafluoroethylene and polychlorotrifluoroethylene), polysiloxanes (e.g., polydimethylsiloxanes). All these engineering thermoplastics are prepared according to well known commercial processes. Reference to such processes can be found in technical publications such as Encyclopedia of Polymer Science and Engineering, John Wiley and Sons, 1988, under the respective engineering thermoplastic polymer topic heading.

Examples of thermoset matrices include but are not restricted to phenolic resins, epoxy resins, unsaturated polyester resins, alkyd resins, furan resins, urea resins, melamine resins, polyurethane resins and aniline resins. Polymerization of components that can polymerize to render a thermoset matrix is carried out in various ways depending on the type of monomer selected. In addition, this step permits the use of various solvents, catalysts and accelerators for polymerization.

Examples of monomers that can polymerize to render thermoplastic matrices include monomers of ethylene, propylene, butadiene, vinyl chloride, vinylidene chloride, styrene, acrylic acid, methacrylic acid, t-butylacrylamide, acrylonitrile, norbornadiene, N-vinylcarbazole, vinylpyridine, N-vinyl-2-pyrrolidone, 1-butene, isobutene, vinylidene, cyanide, 4-methylpentene-1, vinyl acetate, vinylisobutyl ether, methyl vinyl ketone, phenyl vinyl ketone, phenyl vinyl sulfide and acrolein. Examples of the monomer of fluoroethylene resin include tetrafluoroethylene and chlorotrifluoroethylene.

Polymerization of monomers is carried out in various ways depending on the type of monomer selected. In addition, this step permits the use of various solvents, catalysts and accelerators for polymerization. Monomers may or may not react with the second block of the block copolymer depending on the composition of the second block and on the presence of additional functional monomers in the second block.

The composite material prepared using one of the above mentioned procedures is composed of a polymer and a layered silicate uniformly dispersed in the polymer. The content of the clay mineral in the polymer should preferably be 0.01 to 150 parts by weight for 100 parts by weight of the polymer. With content less than 0.01 parts per weight, the clay does not produce the desired reinforcing effect. With a content of more than 150 parts per weight, the resulting composite material is merely an unmoldable powder of interlayer compound.

In one embodiment the functional vinyl or acrylic monomer in the block copolymer is selected from the group consisting of N,N'-dialkylaminoalkyl methacrylate, N,N'-diarylaminoalkyl methacrylate, N,N'-dialkylaminoalkyl acrylate, and N,N'-diarylaminoalkyl acrylate.

The thermoplastic nanocomposite compositions according to the present invention are in some cases vulcanizable materials from which molded articles of manufacture having valuable properties can be produced by conventional shaping processes, such as melt spinning, casting, vacuum molding, sheet molding, injection molding and extruding. Examples of such molded articles are components for technical equipment, apparatus castings, household equipment, sports equipment, bottles, containers, components for the electrical and electronics industries, car components, circuits, fibers, semifinished products that can be shaped by machining and the like. The use of the materials for coating articles by means of powder coating processes is also possible, as is their use as hot-melt adhesives. The molding compositions according to the invention are outstandingly suitable for specific applications of all types since their spectrum of properties can be modified in the desired direction in manifold ways. Such molded products of this invention will derive one or more advantages over products molded with polymers having no dispersed nano-platelet particles including increased modulus, stiffness, wet strength, dimensional stability, and heat deflection temperature, and decreased moisture absorption, flammability, permeability, and molding cycle time.

The molding compositions according to the present invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters such as those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

The compositions of this invention are especially useful for fabrication of extruded films and film laminates, as for example, films for use in food packaging. Such films can be fabricated using conventional film extrusion techniques. The films range typically from about 10 to about 100 microns, preferably from about 20 to about 100 microns and more preferably from about 25 to about 75 microns in thickness. In the film, the major plane of the platelet fillers is substantially parallel to the major plane of the film. The extent of parallelism of particles and film can be determined by X-ray analysis. X-ray analysis is a useful way to describe the crystallinity and orientation of polymer crystals and the orientation of platelet particles. A convenient method of X-ray analysis is described by Hernans, P. H. and Weidinger A., Makromol Chemie, Vol. 44, pp. 24-36 (1961), which is incorporated by reference.

Block copolymer modified clays can be applied to other fields in which traditional organoclays have been used such as for gelling of organic liquids such as lubricating oils, linseed oil, toluene and the like. A large variety of highly useful products such as lubricating greases, are producible through use of such gelling agents. Clays modified according to the present invention can be used as thixotropes in aqueous compositions, such as for paint formulations, and for aqueous suspensions, particularly latex paints and caulks. These modified clays can also be used in a process for deinking wastepaper, where organoclays are utilized as thickeners.

The scope of the present invention can be further appreciated with reference to U.S. Pat. No. 5,578,672, issued to Beall et al.; U.S. Pat. No. 6,036,765, issued to Farrow; U.S. Pat. No. 6,787,592, issued to Powell et al.; U.S. Pat. No. 6,890,502, issued to Bauer et al.; U.S. Pat. No. 5,973,049, issued to Bieser et al.; U.S. Pat. No. 6,583,209, issued to Mehta et al.; and U.S. Pat. No. 7,084,199, issued to Chou et al., each of which is incorporated by reference in its entirety for all purposes. By combining the teachings expressly set out in text herein with the teachings incorporated by reference, the present invention includes a number of processes, compositions and articles of manufacture.

EXAMPLES

The following examples illustrate the invention in more detail, but they should not to be construed as limiting the present invention to the particular examples provided. The scope of the invention is provided in the appended claims.

Preparation of Block Copolymers

Reagents: Glycidyl methacrylate from Dow Química Mexicana, S.A. de C.V.; BPO from Akzo Nobel; Butyl acrylate was acquired from Sigma-Aldrich; 4-hydroxy-2,2,6,6-tetramethylpiperidin-1-oxyl (4-hydroxy-TEMPO) from CIBA. These reagents were used as received. Styrene from Quimir was washed with a sodium hydroxide solution in order to remove the inhibitor and dried with anhydrous sodium sulfate.

Examples 1-8

General procedure (see Table 1 for the amount of reagents in each example). Styrene (St), Glycidyl methacrylate (GMA), nitroxide and initiator (benzoyl peroxide, BPO) were placed in a double-jacket glass reactor and oxygen was removed with nitrogen bubbling for 3 minutes. Oil preheated to 131° C. was circulated through the outside jacket, and the mixture was stirred at 145 rpm. After the desired conversion was reached, heating was suspended and additional styrene and optional monomers (see table 2) were added to the reactor with stirring. After 3 min. of stirring, the reaction was either continued in the glass reactor until 10-20% more conversion was reached or directly poured into a second reactor. Nitrogen was bubbled through, and the reactor was immersed in an oil bath, which was previously heated to 125-130° C., for 18-24 hours to reach the desired conversion.

TABLE 1

Block copolymers. First step composition.

| Example number | FIRST STEP | | | | | |
|---|---|---|---|---|---|---|
| | St (mmol) | GMA (mmol) | GMA (% mol)$^a$ | Nitroxide (mmol) | BPO (mmol) | Conversion (%) |
| 1 | 583.50 | 8.86 | 1.5 | 2.50 | 1.93 | 87.30 |
| 2 | 309.76 | 6.33 | 2.0 | 1.33 | 1.02 | 78.02 |
| 3 | 530.58 | 47.28 | 8.2 | 2.48 | 1.91 | 85.00 |
| 4 | 265.90 | 52.78 | 16.6 | 0.83 | 0.64 | 82.90 |
| 5 | 85.27 | 17.07 | 16.7 | 1.26 | 0.97 | 82.62 |
| 6 | 307.25 | 12.44 | 3.9 | 1.31 | 1.01 | 77.40 |
| 7 | 293.71 | 58.86 | 16.7 | 4.31 | 3.32 | 89.58 |
| 8 | 211.25 | 41.97 | 16.6 | 0.66 | 0.51 | 76.07 |

$^a$Considering the initial GMA to St ratio
NOTE:
Table 1 shows amounts calculated for the synthesis of 100 g of the diblock, while actual amounts were scaled up or down, depending on the size of the reactors used for each case.

TABLE 2

Diblock copolymers. Second step composition

| Example number | SECOND STEP | | | |
|---|---|---|---|---|
| | St (mmol) | Butyl Acrylate (mmol) | Conversion | TOTAL GMA (% mol)$^b$ |
| 1 | 356.6 | | 99.0 | 0.9 |
| 2 | 637.5 | | 99.0 | 0.7 |
| 3 | 357.1 | | 99.0 | 5.1 |
| 4 | 619.5 | | 99.0 | 5.6 |
| 5 | 847.6 | | 99.0 | 1.8 |
| 6 | 631.7 | | 99.0 | 1.3 |
| 7 | 572.3 | | 99.0 | 6.4 |
| 8 | 422.0 | 217.4 | 99.0 | 4.7 |

$^b$Considering the total GMA to monomers (1$^{st}$ and second step) ratio
NOTE:
Table 2 shows amounts calculated for the synthesis of 100 g of the diblock, while actual amounts were scaled up or down, depending on the size of the reactors used for each case.

Molecular weight distributions relative to polystyrene were determined through GPC (ASTM D3536-91) using a Waters 410 RI detector, THF eluent, 1.0 mL/min, at 40° C.; Styragel columns HR 4 and HR 3. Results are shown in table 3.

TABLE 3

Properties of block copolymers.

| Block copolymer example number | FIRST STEP | | | TOTAL | | |
|---|---|---|---|---|---|---|
| | Mn | Mw | PDI | Mn | Mw | PDI |
| 1 | 15052 | 16403 | 1.09 | 27312 | 32841 | 1.20 |
| 2 | 15945 | 17316 | 1.09 | 42674 | 60848 | 1.43 |
| 3 | 15965 | 17994 | 1.13 | 25329 | 30624 | 1.21 |
| 4 | 27526 | 32698 | 1.19 | 49768 | 74509 | 1.50 |
| 5 | 6930 | 7778 | 1.12 | 54500 | 73951 | 1.36 |
| 6 | 15512 | 17141 | 1.11 | 44371 | 61910 | 1.40 |
| 7 | 7826 | 8857 | 1.13 | 16994 | 20353 | 1.20 |
| 8 | 20813 | 25741 | 1.24 | 61006 | 125348 | 2.05 |

Residual Glycidyl methacrylate (GMA). In order to determine the amount of residual GMA, the reaction mixture of example 7 (first step, after 89.58% conversion was achieved), was analyzed using gas chromatography and the amount of GMA was determined using a calibration curve of GMA at a known concentration.

Table 4 shows calibration curve data used to determine GMA content: The standards contain a variable amount of GMA and a fixed amount of toluene as an internal standard, both dissolved in THF. The chromatogram is integrated and the relative areas are calculated (area of GMA peak/toluene area), a linear regression is used to correlate the relative peak area with GMA concentration (relative areas=0.369*(GMA concentration)+0.0644; R2=0.997). A sample of 100 mg of the reaction mixture of example 7 (first step, after 89.58% conversion) was dissolved in THF adding the same amount of toluene as an internal standard as the one used in the standards.

TABLE 4

Gas chromatography calibration curve data used to determine the % w/w of GMA.

| GMA standards concentration (mg/mL) | Peak area (relative to the internal standard) |
|---|---|
| 0 | 0 |
| 1.1 | 0.4333 |
| 2.75 | 1.0353 |
| 5.5 | 2.2264 |
| 11 | 4.0722 |

The mixture of example 7, first step, shows a chromatograph with a relative peak area of 1.0479, which corresponds (using the linear regression equation) to a concentration of 2.665 mg/mL. Taking into account the amount of sample, this corresponds to 2% w/w GMA. Since this sample has 89.58% conversion, only 10.42% of the sample contains monomers, and the concentration of GMA in the monomers then equals 23.96% w/w (2 g GMA*100 g reaction mixture/10.42 g remaining monomer mixture).

The amount of monomeric units in each block can be controlled with the first block conversion, the total conversion and the amount of initiator and controlling agent. The composition of each block can be controlled by the mole percent of monomers added during the first and second step. This can be better understood by looking at examples 1 to 8, where different total amounts of Glycidyl methacrylate and different molecular weights in both blocks are obtained, depending on the initial composition of monomers, nitroxide and initiator, the amount of styrene added in the second step, the first block conversion and the total conversion. The total amount of functional acrylic monomer (GMA, in this case) can be controlled by the initial amount of GMA added, the first block conversion and the amount of monomers added in the second step. For example, examples 4, 5, 7 and 8 have almost the same percent of GMA added in the first step (16.6% mol), but since the amount of styrene added in the second step is different, they have different total amounts of GMA. In examples containing GMA and styrene in the first step, since the reactivities of both monomers are similar, the initial mole percent of GMA added in the first step is similar (but lower) to the mole percent incorporated in the first block. For example 7, the amount of residual GMA in the residual monomers was quantified using gas chromatography (see description below in Table 3), obtaining 23.96% w/w, compared to the initial weight percent that is 27.35% w/w.

Examples 9-32

Polyolefin Modification Using Organic Clays and Block Copolymers

A. Preparation of Clay Master Batches

Examples 9-31. General procedure.

Blend A. 27.3 g of the selected block copolymer (see Table 1) and 22.7 g of Cloisite 10A (acquired from Southern Clay products) were physically mixed by dry blending so as to produce 50 g of the mixture. The mixture was then mixed using a Haake Mixer at 60 rpm and 200° C. for 15 minutes. The blend was cooled and ground.

Maleated polyolefin preparation. Maleated polyolefins are commercially available materials, such as Polybond 3200 and Fusabond from Crompton and DuPont. Maleated polyolefin was treated with zinc acetate dihydrate and water in the proportions indicated in Table 5 at 140° C. using a Haake Mixer.

Blend B. 22 g of Blend A and 28 g of the selected maleated polyolefin (Table 5) were physically mixed by dry blending so as to produce 50 g of the mixture. The mixture was then mixed using a Haake Mixer at 60 rpm and 200° C. for 15 minutes. The blend was cooled and ground.

B. Preparation of Polypropylene Modified by Nanoclays

Examples 9-31. General procedure. 37.5 g of injection grade polypropylene (for example Profax SL648M from Indelpro) and 12.5 g of Blend B were physically mixed by dry blending, so as to produce 60 g of the mixture. The mixture was then mixed using a Haake Rheometer or a Brabender Mixer at 60 rpm and 200° C. for 15 minutes. The blend was cooled and analyzed using X-Ray diffraction. Mechanical properties of blends were also analyzed.

Example 32. Reference material. 57 g of Injection grade polypropylene (for example Profax SL648M from Indelpro) and 3 g of Cloisite 10A were physically mixed by dry blending so as to produce 60 g of the mixture. The mixture was then mixed using a Haake Rheometer and a Brabender Mixer at 60 rpm and 200° C. for 15 minutes. The blend was cooled and analyzed using X-Ray diffraction. Mechanical properties of the blend were also analyzed.

X-ray Diffraction of examples 9-31. Samples of blends 9-31 were pressed at 215.5° C. and a pressure of 8000 Kg/cm2 obtaining films of 0.36 mm thickness. Circles of a diameter of 2.2 cm were cut from this film and placed in the glass support of the Diffractometer. X-Ray diffractograms were acquired using a SIEMENS D50000, and a radiation of Cu Kα ($\lambda$=1.5406 Å), using an interval from $2°<2\theta<35°$. Interlayer distances are calculated using Bragg's law ($d=\lambda/(2 \sin(\theta))$). Since some of the samples show more than one peak from 1.5 to 9° (2θ), an average interlayer separation is calculated as the sum of the different observed interlayer separations ($d_i$,

TABLE 5

Maleated polyolefin preparation for examples 9-31.

| Example Number | Molecular weight of maleated polyolefin | Number of maleic anhydride molecules in maleated polyolefin | PP-g-MA (g) | Zinc acetate dihydrate/ H2O | Zinc acetate dihydrate (g) |
| --- | --- | --- | --- | --- | --- |
| 9 | 117,900 | 12 | 47.6 | 0.5 | 2.4 |
| 10 | 117,900 | 12 | 47.6 | 2.0 | 2.4 |
| 11 | 117,900 | 12 | 48.5 | 1.3 | 1.5 |
| 12 | 117,900 | 12 | 48.5 | 1.3 | 1.5 |
| 13 | 117,900 | 12 | 48.5 | 1.3 | 1.5 |
| 14 | 117,900 | 12 | 47.6 | 3.0 | 2.4 |
| 15 | 117,900 | 12 | 46.5 | 3.0 | 3.5 |
| 16 | 117,900 | 12 | 47.6 | NA | 2.4 |
| 17 | 117,900 | 12 | 47.6 | 2.0 | 2.4 |
| 18 | 117,900 | 12 | 47.6 | NA | 2.4 |
| 19 | 117,900 | 12 | 50.0 | NA | 0.0 |
| 20 | 117,900 | 12 | 50.0 | NA | 0.0 |
| 21 | 117,900 | 12 | 48.5 | 1.3 | 1.5 |
| 22 | 117,900 | 12 | 50.0 | NA | 0.0 |
| 23 | 117,900 | 12 | 49.5 | NA | 0.5 |
| 24 | 23,210 | 2.3 | 49.5 | NA | 0.5 |
| 25 | 117,900 | 12 | 49.5 | NA | 0.5 |
| 26 | 23,210 | 2.3 | 49.5 | NA | 0.5 |
| 27 | 117,900 | 12 | 49.5 | NA | 0.5 |
| 28 | 117,900 | 12 | 49.5 | NA | 0.5 |
| 29 | 117,900 | 12 | 49.5 | NA | 0.5 |
| 30 | 117,900 | 12 | 49.5 | NA | 0.5 |
| 31 | 117,900 | 12 | 49.5 | NA | 0.5 |

NA: The ratio cannot be calculated since water was not added.

expressed in Å) multiplied by its relative intensity ($\Sigma(d_i*R_i)$). Relative intensity is the intensity of the signals observed from 1.5 to 9° (2θ) divided by the sum of the intensity of the three signals, $R_i=I_i/(I_1+I_2 \ldots +I_n)$. Results are shown in Table 6.

TABLE 6

X-ray diffraction the three signals observed from 60 to 15 Å. Blends 9-31.

| Example Number | Block copolymer from table 1 | Interlayer distance by XRD. Average interlayer separation (Å) |
|---|---|---|
| 9 | 7 | 26.3 |
| 10 | 7 | 29.5 |
| 11 | 7 | 30.8 |
| 12 | 7 | 30.9 |
| 13 | 1 | 17.4 |
| 14 | 7 | 27.8 |
| 15 | 7 | 27.5 |
| 16 | 7 | 26.3 |
| 17 | 1 | 16.2 |
| 18 | 1 | 28.2 |
| 19 | 7 | 28.0 |
| 20 | 1 | 25.3 |
| 21 | none[a] | 14.5 |
| 22 | none[a] | 15.4 |
| 23 | 1 | 46.7 |
| 24 | 1 | 55.8 |
| 25 | 3 | 35.9 |
| 26 | 3 | 55.3 |
| 27 | 4 | 38.4 |
| 28 | 5 | 41.1 |
| 29 | 6 | 40.3 |
| 30 | 7 | 37.0 |
| 31 | 8 | 47.8 |

[a]In order to maintain the amount of clay constant, in these examples the amount of block copolymer was substituted by more PP-g-MA treated as indicated in the table.
As a reference the interlayer distance of Cloisite 10A determined by XRD is 11.379Å.

Examples 9-22 show the effect of using block copolymers to modify organic clays, in polypropylene/clay nanocomposites. Examples 21 and 22 show that interlayer separation obtained by blending the organic clay with maleated polypropylene and polypropylene (14.5 and 15.4 Å) are lower than is obtained when block copolymers are incorporated (examples 19 and 20 with interlayer separations of 28 and 25.3 Å respectively).

Examples 9-22 also illustrate the use of water and zinc acetate dihydrate to treat maleated polypropylene before it is blended with the block copolymer, organic clay and polypropylene. In general, better results (in terms of intergallery separation) are obtained when zinc acetate dihydrate is used to treat maleated polypropylene before it is blended with the organic clay, the block copolymer and the polypropylene. This effect can be observed by comparing examples 19 and 20 where block copolymers 1 and 7 are used but maleated polypropylene is not treated with zinc acetate, compared to other experiments (examples 9-18) where maleated polypropylene is pre-treated. Choosing the correct amount of zinc acetate dihydrate and water to treat maleated polypropylene is complicated since it also seems to depend on the type of block copolymer used. Examples 10 and 14 show the effect of increasing the amount of water used for the maleated polypropylene treatment maintaining the amount of zinc acetate constant for block copolymer 7. (See Table 1.) The examples show that an increase in the amount of water increases the interlayer separation, but if the amount of water continues to increase (example 9) then the interlayer separation decreases again. Examples 17 and 18 show that an increase in water content (maintaining the amount of zinc acetate dehydrate constant too) for block copolymer 1 (see Table 1) is in contrast to block copolymer 7, not beneficial in increasing the interlayer distance. Examples 18 and 20 compare the effect of increasing the amount of zinc acetate dehydrate in absence of water. In this case an increase in zinc acetate dehydrate content is beneficial. These examples illustrate that the proportions of the reagents (zinc acetate dehydrate and water) to treat maleated polypropylene must be studied and adjusted for the type of block copolymer used in the blend in order to improve the clay galleries separation.

Examples 23-26 show the effect of changing the type of maleated polyolefin (molecular weight and functionality) in improving the clay intergallery separation. The examples illustrate that low molecular weight maleated polyolefin (example 24 and 26) show larger inter layer separations.

Examples 23 and 31 also illustrate the effect of changing the type of block copolymer and maintaining a constant amount of zinc acetate dihydrate and water to pretreat the maleated polyolefin. The best results are obtained with block copolymer 8 (see Table 1), but in general, large interlayer separations are observed. In order to demonstrate the effects of the use of block copolymers in polyolefin clay nanocomposites, mechanical properties of blends from examples 23-31 were also determined.

Tension test specimens were cut from the film prepared for X-ray diffraction experiments, according to the ASTM D638M-93, Standard Test Method for Tensile Properties of Plastics (Metric) (TYPE M-III, FIG. 1 of the standard test method). Results are shown in Table 7. Samples from examples 23 and 32 were analyzed using a Carl Zeiss EM910 120 kV transmission electron microscope after microtoming at 0° C.

TABLE 7

Mechanical properties of blends. Examples 23-32.

| Example number | Yield stress (Mpa) | Elastic modulus (Mpa) | Yield stress/ Yield stress of example 32 | Elastic modulus/ Elastic modulus of example 32 |
|---|---|---|---|---|
| 23 | 24.16 | 980.51 | 1.11 | 5.24 |
| 24 | 14.48 | 440.27 | 0.66 | 2.35 |
| 25 | 18.68 | 784.54 | 1.21 | 4.20 |
| 26 | 10.81 | 464.70 | 0.49 | 2.49 |
| 27 | 18.59 | 528.14 | 0.85 | 2.82 |
| 28 | 18.45 | 672.35 | 0.84 | 3.60 |
| 29 | 18.86 | 795.99 | 0.86 | 4.26 |
| 30 | 21.56 | 965.51 | 0.99 | 5.16 |
| 31 | 18.97 | 930.53 | 0.87 | 4.98 |
| 32[a] | 21.84 | 186.97 | 1 | 1 |

[a]The values obtained in example 32 are included as a reference.

Table 7 illustrates the use of block copolymers to improve mechanical properties of polypropylene/clay nanocomposites. In all cases the modulus obtained is at least twice of that obtained without the use of block copolymers. The best results are obtained using block copolymer 7 in example 30 (Table 7) and block copolymer 1 in example 3 (Table 7), with an elastic modulus more than five times the one obtained in the reference material. Analyzing the transmission electron microscopy of samples from example 23 and the reference material (example 32) gives an explanation of such an extraordinary improvement in mechanical properties. The clay layers are intercalated and in some areas exfoliated when the block copolymer is used, compared with the TEM image obtained for example 32 where very large particles of clay (around 5μ) are observed.

Examples 23 and 26 (Table 7) illustrate the use of different maleated polypropylenes (low and high molecular weight). Polypropylene nanocomposites containing a high molecular weight maleated polypropylene provide better performance than polypropylene nanocomposites containing a low molecular weight maleated prolypropylene

Synthesis of Hydrophilic Block Copolymers for Clay Minerals Modification

Reagents: Dibenzoyl peroxide (BPO) and 2,5-Dimethyl-2,5-di(tert-butylperoxy)hexane (Trigonox 101) were acquired from Akzo Nobel; p-tert-butyl styrene (TBS) and 2-(diethylamino)ethyl methacrylate (DEAEMA) were acquired from Sigma-Aldrich; 2-(dimethylamino)ethyl methacrylate (DMAEMA) was acquired from Degussa and Dibenzyl trithiocarbonate (DBTTC) was acquired from Arkema. Reagents were used as received.

Examples 33 and 34

Preparation of Poly(4-tert-butylstyrene-co-2-diethylaminoethyl methacrylate)-block-(4-tert-butylstyrene-co-2-diethylaminoethyl methacrylate) and poly(4-tert-butylstyrene-co-2-dimethylaminoethylmethacrylate)-block-(4-tert-butylstyrene-co-2-dimethylaminoethyl methacrylate)

Examples 33 and 34. General Procedure. (See Table 8 for the amount of reagents in each example). Monomers, DBTTC and initiators were placed in a double jacket glass reactor and oxygen was removed with nitrogen bubbling during 3 min. Preheated oil (130° C.) is circulated through the outside jacket and stirring is started (300 rpm). After the desired conversion is reached, heating is suspended and additional TBS is added to the reactor with stirring. After 3 min. of stirring, the reaction was either continued in the glass reactor until 10-20% more conversion was reached or directly poured into a second reactor. Nitrogen is bubbled and the reactor is immersed in an oil bath previously heated to 120-125° C. for 18 h to reach the desired conversion. The remaining monomer is removed by devolatilization.

Molecular weight distributions relative to polystyrene were determined through GPC (ASTM D3536-91) using a Waters 410, RI detector, THF eluent, 1.0 mL/min, at 40° C.; Styragel columns HR 4 and HR 3. Results are shown in Table 9.

TABLE 9

Properties of block copolymers.

| Block copolymer | FIRST STEP | | | TOTAL | | |
|---|---|---|---|---|---|---|
| Example number | Mn | Mw | PDI | Mn tot | Mw | PDI |
| 33 | 6869 | 8965 | 1.30 | 8118 | 11129 | 1.37 |
| 34 | 16235 | 24770 | 1.53 | 19339 | 37332 | 1.93 |

Residual DEAEMA. In order to determine the amount of residual functional monomer, the reaction mixture of example 33 (first step, after 68.3% conversion was achieved), was analyzed by dissolving it in CDCl3 and analyzing it by 1H NMR (Bruker Advanced 300 spectrometer). The results obtained by integrating the signals corresponding to the different monomers belonging to the polymer and to residual monomers are: polymer composition: TBS=28.10% mol and DEAEMA=71.9% mol; residual monomers composition: TBS=16.05% mol and DEAEMA=83.95% mol.

Example 35-36

Preparation of Polyolefin Nanocomposites Using Clays Modified with Block Copolymers A. Clay Modification Using Block Copolymers Examples 35 and 36. General Procedure. 63.05 g of water and 1.95 g of Cloisite Na+ (acquired from Southern Clay Products Inc.) were mixed at 10,000 rpm and 60° C. for 15 minutes. The block copolymer (Block copolymer from example 33 and 34 respectively) previously dissolved in water (0.57 g of selected block copolymer in 35 g of hot water) was added to the mixture; the pH was adjusted to 1 and the mixture is stirred at 1200 rpm for 1 hour at 60° C. The block copolymer modified clay suspension was then filtered and the solid was dried at 50° C. for 24 hours. The dry material was grinded to obtain a fine powder (5-10 μm).

The powder obtained was characterized using X-ray Diffraction and thermogravimetric analysis.

X ray Diffraction (XRD): X-Ray diffractograms of powders from samples 35 and 36 were acquired using a SIEMENS D5000, and a radiation of Cu Kα (λ=1.5406 Å), using an interval from 1.5°<2θ<15°. The XRD of examples 35 and 36 show a complete exfoliation (no peak is observed), which is completely outstanding, considering that commercially available organic clays only show different degrees of intercalation but not a complete exfoliation. These examples show that the block copolymers of the present invention have the unusual property of exfoliating completely the clay, which is expected to facilitate its incorporation into a variety

TABLE 8

Block copolymers composition

| Block copolymer Example number | FIRST STEP | | | | | | | SECOND STEP TBS | |
|---|---|---|---|---|---|---|---|---|---|
| | TBS (mmol) | DEAEMA (mmol) | DMAEMA (mmol) | DBTTC (mmol) | BPO (mmol) | Trigonox 101 (mmol) | Conversion (%) | (second block) (mmol) | Total Conversion (%) |
| 33 | 560.00 | 1680.00 | | 20.50 | 2.57 | | 68.30 | 750.62 | 83.54 |
| 34 | 500.00 | | 1500.00 | 15.80 | 2.03 | 1.20 | 80.00 | 591.41 | 97.28 | of polymeric matrices (depending on the composition of the blocks of the block copolymer) and improve the performance of the polymer/clay nanocomposite.

TGA: The amount of adsorbed organic material (block copolymer) is determined by thermogravimetric analysis (TGA) using the following method: 1: Ramp 20.0° C./min to 120.0° C.; 2: Isothermal for 10.0 min; 3: Equilibrate at 35.0° C.; 4: Ramp 20.0° C./min to 1000.0° C. For comparison purposes the TGA of two commercial clays (Cloisite 20A and 30B, both from Southern Clay Products Inc.) are also included. The TGA shows an outstanding performance of the block copolymer of the present invention in comparison with commercially-available clays. The degradation temperature of the block copolymer modified clay is higher than the commercially-available clays and since less amount of organic material (block copolymer, in this case) is required to modify the clay, the amount of solid content is also increased considerably (80% vs 70 or 63%). Both the higher degradation temperature and the higher amount of solids are beneficial for the modification of different polymeric matrices. A higher temperature allows it to be used in a wider variety of polymers (with higher melting point or glass transition temperature), including engineering thermoplastics. A higher solids content allows one to use less modified clay in the polymeric matrix. For example, if a compounder wants to prepare a polymer with 5% clay, using a commercially-available clay with 63% solids, then he would have to add 8.33 g of the organic clay per each 100 g of polymeric matrix. In the case of the present invention, he would only have to add 6.25 g of the block copolymer modified clay to obtain the same amount of loading. Considering also that the added block copolymer modified clay is already exfoliated, then it is expected that a polymeric nanocomposite containing a block copolymer modified clay would have a better performance than the same polymeric nanocomposite with the same percent of a commercially-available organic clay that is not completely exfoliated.

B. Polypropylene-Clay Nanocomposites Preparation

Example 37

46.23 g of injection grade polypropylene (for example Profax SL648M from Indelpro) and 3.77 g of modified clay were physically mixed by dry blending so as to produce 50 g of the mixture. The mixture was then mixed using a Brabender Mixer at 80 rpm and 170° C. for 15 minutes. The blend was cooled and analyzed using X-Ray diffraction.

Example 38

(Reference material). 38.65 g of injection grade polypropylene (for example Profax SL648M from Indelpro), 7.29 g of maleated polyolefin (Polybond 3200 from Crompton) and 3.85 g of Closite 20A were physically mixed by dry blending so as to produce 60 g of the mixture. The mixture was then mixed using a Brabender Mixer at 80 rpm and 200° C. for 15 minutes. The blend was cooled and analyzed using X-Ray diffraction.

Example 39

(Reference material). 39.18 g of injection grade polypropylene (for example Profax SL648M from Indelpro), 7.35 g of maleated polyolefin (Polybond 3200 from Crompton) and 3.47 g of Closite 30B were physically mixed by dry blending so as to produce 60 g of the mixture. The mixture was then mixed using a Brabender Mixer at 80 rpm and 200° C. for 15 minutes. The blend was cooled and analyzed using X-Ray diffraction.

X ray diffraction of examples 37-39. Samples of blends 37-39 were pressed at 200° C. and a pressure of 3000 Kg/cm2 obtaining films of 0.36 mm thickness. Circles of a diameter of 2.2 cm were cut from this film and placed in the glass support of the Diffractometer. X-Ray difractograms were acquired using a SIEMENS D5000, and a radiation of Cu K$\alpha$ ($\lambda$=1.5406 Å), using an interval from 1.5°<2$\theta$<15°. Interplanar distances are calculated using Bragg's law (d=$\lambda$/(2 sin ($\theta$))). For sample 37, complete exfoliation was observed while the reference materials show an interlayer distance of 26.7 Å (Example 38 with Cloisite 20A) and 14.6 Å (Example 39, Cloisite 30B).

Having described the invention above, various modifications of the techniques, procedures, materials, and equipment will be apparent to those skilled in the art. It is intended that all such variations within the scope and spirit of the invention be included within the scope of the appended claims or within the scope of claims subsequently made to the invention.

What is claimed is:

1. A modified clay mineral having a composition, comprising:
   a) 67-99% wt of a layered natural and/or synthetic clay mineral having exchangeable cations; and
   b) 0.5-33% wt of a block copolymer having a composition, comprising: a first block comprising monomeric units of a functionalized acrylic and/or functionalized vinyl monomer and monomeric units of a vinyl monomer; and a second block comprising monomeric units of one or more vinyl monomers and monomeric units of the functionalized acrylic and/or functionalized vinyl monomer in the first block,
   wherein the clay mineral is intercalated and/or exfoliated by the block copolymer.

2. The modified clay mineral of claim 1, wherein the functional acrylic and/or functional vinyl monomers are monomers which can be polymerized using controlled radical polymerization containing positively charged monomers or monomers that upon pH change become positively charged.

3. The modified clay mineral of claim 1, wherein the functional group contained in functional acrylic and/or functional vinyl monomers in the first block is selected from the group consisting of ammonium, alkyl ammonium, aryl ammonium ($-N^+R_{(3-n-m)}Ar_mH_n$ where (n+m)$\leq$3), aryl and alkyl phosphonium ($-P^+R_{(3-n-m)}Ar_mH_n$ where (n+m)$\leq$3), aryl and alkyl sulfonium ($-S^+R_{(2-n-m)}Ar_mH_n$ where (n+m)$\leq$2), substituted ammonium, ($-N^+X_1X_2X_3$) phosphonium ($-P^+X_1X_2X_3$), or sulfonium ($-S^+X_1X_2$), wherein $X_1$, $X_2$ and $X_3$ are each individually H or a $C_1$-$C_{20}$ group selected from alkyl, aryl, perfluoroalkyl, arylalkyl, alkylaryl and any of these substituted with one or more oxygen, nitrogen, chlorine, fluorine, bromine, iodine, sulfur and phosphorous, imidazolium, triazolium, and substituted derivatives thereof, and wherein R is an alkyl group and Ar is an aryl group.

4. The modified clay mineral of claim 3, wherein the second block of the block copolymer comprises vinyl monomers with a functional group selected from the group consisting of acid, hydroxyl, epoxy and amino.

5. The modified clay mineral of claim 1, wherein the clay mineral is a natural, synthetic or modified clay selected from the group consisting of smectite, vermiculite, mica, chlorite and halloysite, synthetic mica, synthetic saponite, hectorite, laponite, fluorhectorite, hydroxyl hectorite, boron fluophlogophite, hydroxyl boron phlogopite, talc, fluortalc, polylithionite, fluorpolylithionite, phlogapite, fluorphlogopite, fluorinated montmorillonite, fluorinated mica and combinations thereof.

6. The modified clay mineral of claim 1, wherein the ratio between the clay mineral and the block copolymer in the composition is between 100:1 and 100:30.

7. The modified clay mineral of claim 1, wherein the block copolymer has a positive moiety that replaces the exchangeable cations in the clay mineral.

8. A composition for a layered clay mineral, comprising:
a natural and/or synthetic clay mineral modified by a block copolymer,
wherein the clay mineral comprises layers bound together by cations before being modified,
wherein the clay mineral has a first average distance between layers before modification and a second average distance between layers after modification, wherein the second average distance is greater than the first average distance,
wherein the block copolymer has a composition comprising: a first block comprising monomeric units of a functionalized acrylic and/or functionalized vinyl monomer and monomeric units of a vinyl monomer; and a second block comprising monomeric units of one or more vinyl monomers and monomeric units of the functionalized acrylic and/or functionalized vinyl monomer in the first block, and
wherein the amount of the clay mineral in the composition is between about 50% and about 99% by weight.

9. The composition of claim 8, wherein the modified clay mineral contains between about 1% and about 33% wt of the block copolymer.

10. The composition of claim 8, wherein the cations are Na+, Ca2+, K+, and/or Mg2+, and wherein the block copolymer has a positive moiety that replaces a cation through a cation-exchange reaction and thereby increases the average distance between layers.

11. The composition of claim 9, wherein the clay mineral is exfoliated by the block copolymer.

12. The composition of claim 8, wherein the monomeric units of a functionalized acrylic and/or functionalized vinyl monomer that comprise the first block are selected from the group consisting of glycidyl methacrylate, acrylic acid, methacrylic acid, 2-hydroxyethyl methacrylate, maleic anhydride, 2-dimethylaminoethyl methacrylate, 2-diethylaminoethyl methacrylate, N,N'-dialkylaminoalkyl methacrylate, N,N'-diarylaminoalkyl methacrylate, N,N'-dialkylaminoalkyl acrylate and N,N'-diarylaminoalkyl acrylate, and wherein the block copolymer has a number average molecular weight of about 25,000 to about 350,000.

13. The composition of claim 8, wherein the monomeric units of a functionalized acrylic and/or functionalized vinyl monomer that comprise the first block are selected from the group consisting of glycidyl methacrylate, 2-hydroxyethyl methacrylate, 2-dimethylaminoethyl methacrylate, 2-diethylaminoethyl methacrylate, N,N'-dialkylaminoalkyl methacrylate, N,N'-diarylaminoalkyl methacrylate, N,N'-dialkylaminoalkyl acrylate and N,N'-diarylaminoalkyl acrylate.

14. The composition of claim 1, wherein the block copolymer has a number average molecular weight of about 25,000 to about 350,000.

15. The composition of claim 1, wherein the monomeric units of a functionalized acrylic and/or functionalized vinyl monomer that comprise the first block are selected from the group consisting of glycidyl methacrylate, acrylic acid, methacrylic acid, 2-hydroxyethyl methacrylate, maleic anhydride, 2-dimethylaminoethyl methacrylate, 2-diethylaminoethyl methacrylate, N,N'-dialkylaminoalkyl methacrylate, N,N'-diarylaminoalkyl methacrylate, N,N'-dialkylaminoalkyl acrylate and N,N'-diarylaminoalkyl acrylate.

16. The composition of claim 15, wherein the block copolymer has a number average molecular weight of about 25,000 to about 350,000.

17. The composition of claim 1, wherein the monomeric units of a functionalized acrylic and/or functionalized vinyl monomer that comprise the first block are selected from the group consisting of glycidyl methacrylate, 2-hydroxyethyl methacrylate, 2-dimethylaminoethyl methacrylate, 2-diethylaminoethyl methacrylate, N,N'-dialkylaminoalkyl methacrylate, N,N'-diarylaminoalkyl methacrylate, N,N'-dialkylaminoalkyl acrylate and N,N'-diarylaminoalkyl acrylate.

18. A modified clay mineral having a composition, comprising:
a) 0.5-99% wt of a layered natural and/or synthetic clay mineral having exchangeable cations; and
b) 0.5-99% wt of a block copolymer having a composition, comprising: a first block comprising monomeric units of a functionalized acrylic and/or functionalized vinyl monomer and monomeric units of a vinyl monomer; and a second block comprising monomeric units of one or more vinyl monomers and monomeric units of the functionalized acrylic and/or functionalized vinyl monomer in the first block,
wherein the monomeric units of a functionalized acrylic and/or functionalized vinyl monomer that comprise the first block are selected from the group consisting of glycidyl methacrylate, 2-hydroxyethyl methacrylate, 2-dimethylaminoethyl methacrylate, 2-diethylaminoethyl methacrylate, N,N'-dialkylaminoalkyl methacrylate, N,N'-diarylaminoalkyl methacrylate, N,N'-dialkylaminoalkyl acrylate, and N,N'-diarylaminoalkyl acrylate.

* * * * *